(12) United States Patent
Watanabe

(10) Patent No.: US 12,216,294 B2
(45) Date of Patent: Feb. 4, 2025

(54) OPTICAL ELEMENT, PROJECTION OPTICAL APPARATUS, AND PROJECTOR

(71) Applicant: SEIKO EPSON CORPORATION, Tokyo (JP)

(72) Inventor: Kaho Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 485 days.

(21) Appl. No.: 17/708,613

(22) Filed: Mar. 30, 2022

(65) Prior Publication Data
US 2022/0317342 A1  Oct. 6, 2022

(30) Foreign Application Priority Data
Mar. 31, 2021 (JP) ................... 2021-060803

(51) Int. Cl.
*G02B 3/04* (2006.01)
*G02B 1/04* (2006.01)

(52) U.S. Cl.
CPC ............... *G02B 3/04* (2013.01); *G02B 1/041* (2013.01)

(58) Field of Classification Search
CPC .......... G02B 3/04; G02B 1/041; G02B 7/025; G02B 27/0927; G02B 7/021; G02B 27/149; G02B 1/04; G03B 21/14; G03B 21/142
See application file for complete search history.

(56) References Cited

U.S. PATENT DOCUMENTS

| 6,717,749 B2 | 4/2004 | Abe |
| 2003/0081331 A1 | 5/2003 | Abe |
| 2020/0124826 A1 | 4/2020 | Kitsunezuka et al. |
| 2020/0278595 A1 | 9/2020 | Yanagisawa et al. |
| 2020/0278601 A1* | 9/2020 | Yanagisawa ....... G02B 17/0856 |
| 2021/0191092 A1* | 6/2021 | Yanagisawa ........... G02B 7/021 |

FOREIGN PATENT DOCUMENTS

| JP | 2001-278642 A | 10/2001 |
| JP | 2003-139914 A | 5/2003 |
| JP | 2015-108642 A | 6/2015 |
| JP | 2019-12196 A | 1/2019 |
| JP | 2020-140153 A | 9/2020 |
| WO | 2013/136972 A1 | 9/2013 |

* cited by examiner

*Primary Examiner* — Magda Cruz
(74) *Attorney, Agent, or Firm* — Oliff PLC

(57) ABSTRACT

An optical element includes a first light-transmissive member made of a first resin and having a first surface having an aspheric shape and a first joint surface provided on the side opposite from the first surface, a second light-transmissive member made of a material different from the material of the first light-transmissive member and having a second joint surface, and a first joining member and a second joining member that join the first joint surface and the second joint surface to each other. The first joining member is made of a silicone adhesive and disposed in the smaller one of effective diameter regions of the first light-transmissive member and the second light-transmissive member. The second joining member is made of an adhesive having adhesiveness higher than the adhesiveness of the silicone adhesive and is disposed outside the first joining member and outside the smaller effective diameter region.

14 Claims, 12 Drawing Sheets

OPTICAL ELEMENT, PROJECTION
OPTICAL APPARATUS, AND PROJECTOR

The present application is based on, and claims priority from JP Application Serial Number 2021-060803, filed Mar. 31, 2021, the disclosure of which is hereby incorporated by reference herein in its entirety.

BACKGROUND

1. Technical Field

The present disclosure relates to an optical element, a projection optical apparatus, and a projector.

2. Related Art

There has been a known joined lens formed of a plurality of lenses joined to each other (see JP-A-2015-108642, for example).

The joined lens described in JP-A-2015-108642 is formed of a convex lens and a concave lens attached to each other with optical surfaces thereof joined to each other with an adhesive. The curvature of the optical surface of the convex lens and the curvature of the optical surface of the concave lens are equal to each other. The adhesive is a UV-curable, ene-thiol-based adhesive and is spread over the entire area between the optical surfaces of the convex lens and the concave lens. A solvent-free epoxy resin mixed with carbon black or titanium black is applied to an outer circumferential end portion of the adhesive. A room-temperature-curable epoxy adhesive is, for example, used as the epoxy resin.

A typical UV-curable adhesive cures when irradiated with ultraviolet light and is therefore an adhesive suitably used to join light-transmissive parts to each other.

The ene-thiol-based adhesive may, however, deteriorate due to light incident thereon, undesirably resulting in changes in the optical characteristics of the joined lens. For example, in the case of the joined lens described in JP-A-2015-108642, a UV-curable ene-thiol-based adhesive is used to join the convex lens and the concave lens to each other, so that the optical characteristics of the joined lens may undesirably change. When the optical density in the lens is high, in particular, the deterioration of the ene-thiol-based adhesive may advance, and the optical characteristics of the lens may significantly change.

SUMMARY

An optical element according to a first aspect of the present disclosure includes a first light-transmissive member made of a first resin and having a first surface having an aspheric shape and a first joint surface provided on a side opposite from the first surface, a second light-transmissive member made of a material different from the material of the first light-transmissive member and having a second joint surface, and a first joining member and a second joining member that join the first joint surface and the second joint surface to each other. The first joining member is made of a silicone adhesive and disposed in a smaller effective diameter region of the effective diameter region of the first light-transmissive member and the effective diameter region of the second light-transmissive member. The second joining member is made of an adhesive having adhesiveness higher than the adhesiveness of the silicone adhesive and is disposed outside the first joining member and outside the smaller effective diameter region.

A projection optical apparatus according to a second aspect of the present disclosure is a projection optical apparatus that projects light incident thereon and includes the optical element according to the first aspect described above.

A projector according to a third aspect of the present disclosure includes a light modulator that modulates light outputted from a light source and the projection optical apparatus according to the second aspect described above, which projects the light modulated by the light modulator.

DESCRIPTION OF EXEMPLARY EMBODIMENTS

First Embodiment

A first embodiment of the present disclosure will be described below with reference to the drawings.

In the present specification, the primary component means the most abundant component among the components of a composition.

Exterior Configuration of Projector

Figure 1:
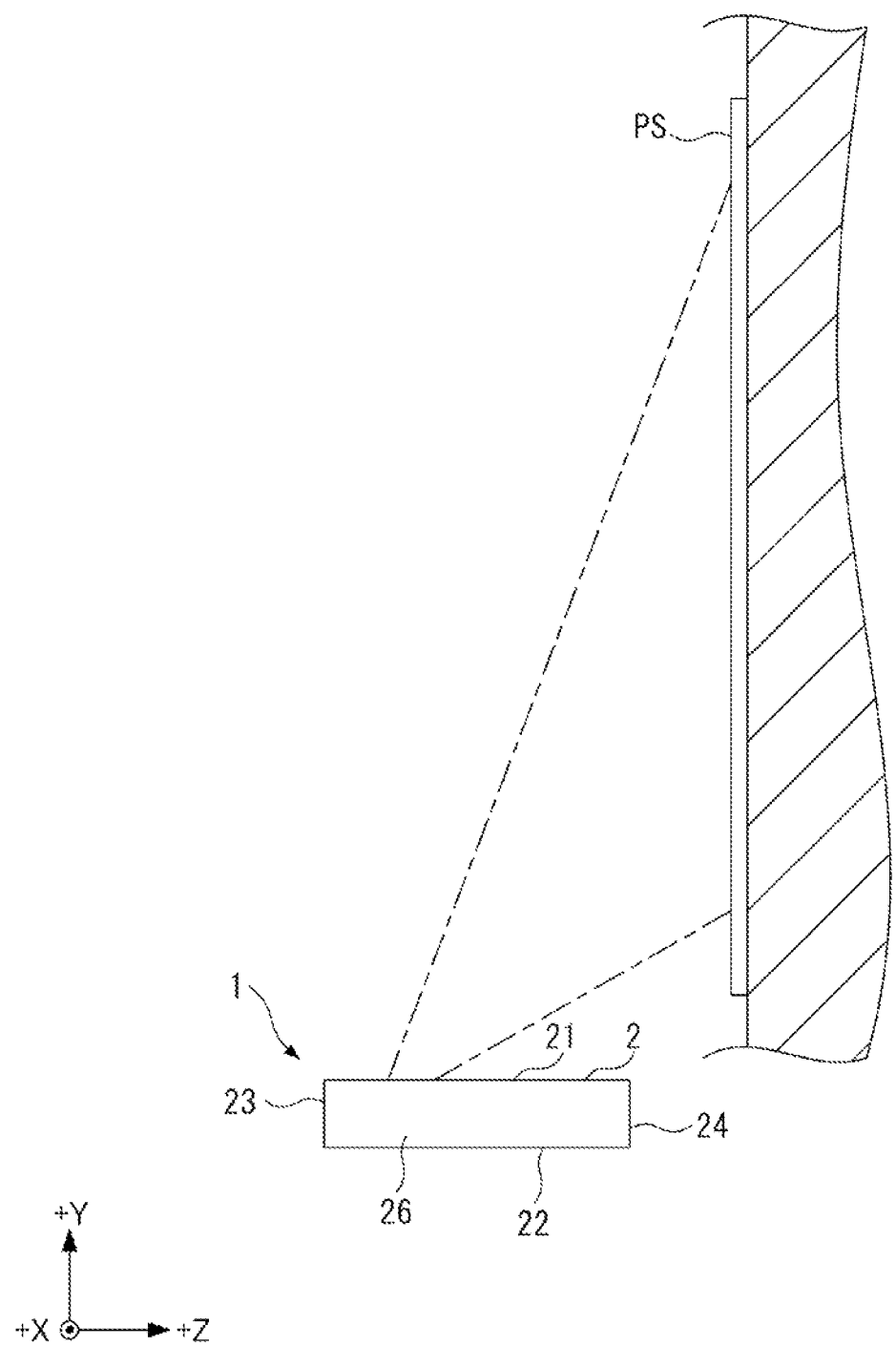
FIG. 1 is a side view showing how a projector according to a first embodiment is used.
Figure 2:
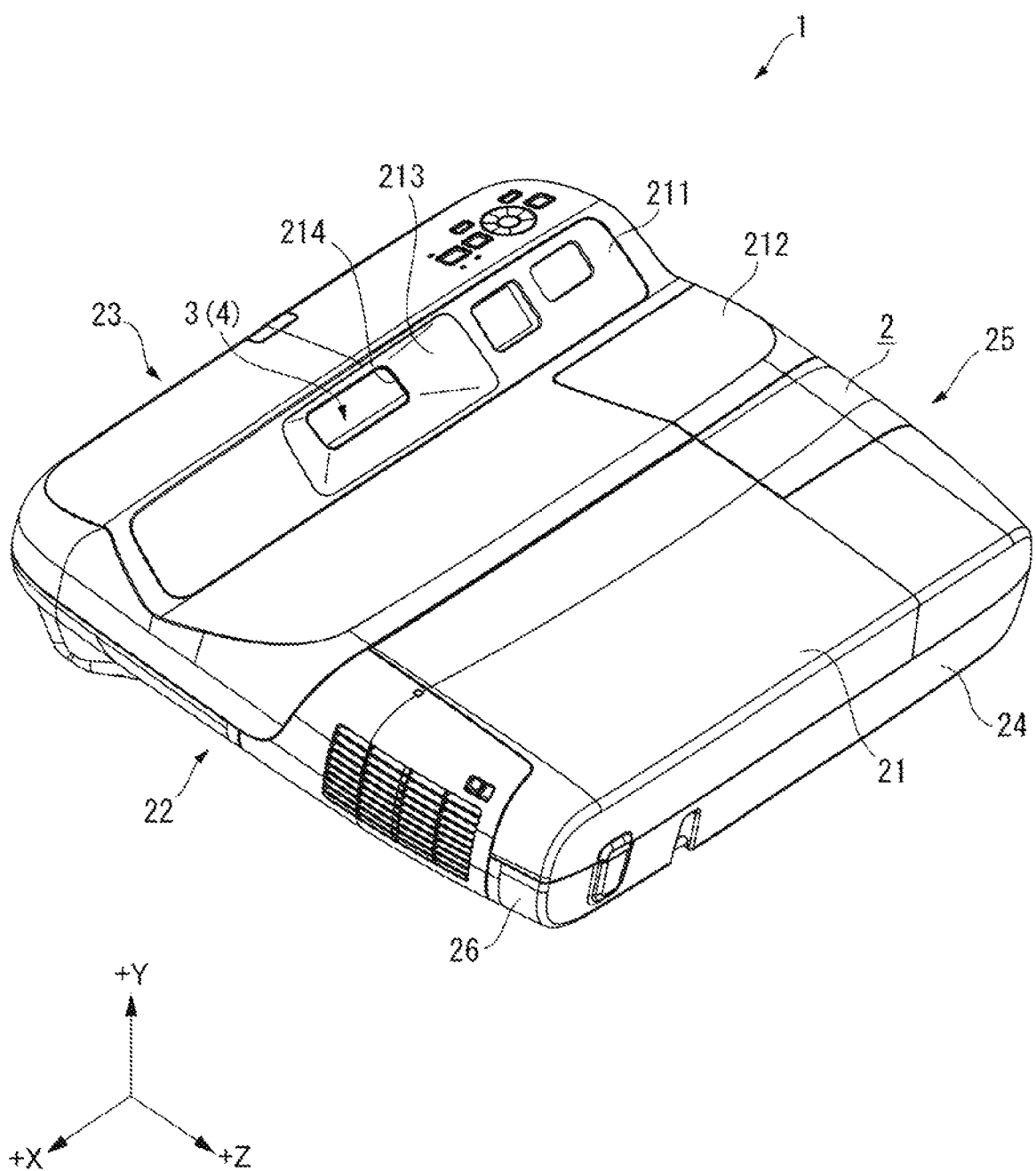
FIG. 2 is a perspective view showing the external appearance of the projector according to the first embodiment.

FIG. 1 is a side view showing how a projector 1 according to the present embodiment is used. FIG. 2 is a perspective view showing the external appearance of the projector 1.

The projector 1 according to the present embodiment is an image display apparatus that forms an image according to image information and projects the formed image onto a projection receiving surface PS, such as a screen, as shown in FIG. 1. For example, the projector 1 is used with the projector 1 installed on a floor, a stand, or any other installation surface or with the projector 1 suspended from, for example, a ceiling or a wall. The projector 1 includes an exterior enclosure 2, which forms the exterior of the projector 1, as shown in FIGS. 1 and 2.

Configuration of Exterior Enclosure

The exterior enclosure 2 includes a top surface section 21, a bottom surface section 22, a front surface section 23, a rear surface section 24, a left side surface section 25, and a right side surface section 26 and is formed in a substantially rectangular parallelepiped shape, as shown in FIG. 2.

The top surface section 21 and the bottom surface section 22 are surfaces of the exterior enclosure 2 that are opposite from each other.

The front surface section 23, the rear surface section 24, the left side surface section 25, and the right side surface section 26 are side surface sections that intersect with the top surface section 21 and the bottom surface section 22. The front surface section 23 and the rear surface section 24 are surfaces opposite from each other, and the left side surface section 25 and the right side surface section 26 are surfaces opposite from each other.

In the state shown in FIG. 1, in which the projector 1 is used, the projector 1 is so installed that the top surface section 21 faces upward and the rear surface section 24 faces the projection receiving surface PS.

It is assumed in the following description that three directions perpendicular to one another are called directions +X, +Y, and +Z. It is assumed in the present embodiment that the direction +X is the direction from the left side surface section 25 toward the right side surface section 26, the direction +Y is the direction from the bottom surface section 22 toward the top surface section 21, and the direction +Z is the direction from the front surface section 23 toward the rear surface section 24. That is, in the present embodiment, the directions +X, +Y, and +Z are perpendicular to one another. Although not illustrated, the direction opposite the direction +X is called a direction −X, the direction opposite the direction +Y is called a direction −Y, and the direction opposite the direction +Z is called a direction −Z.

The top surface section 21 has a first inclining section 211, a second inclining section 212, a recess 213, and an image opening 214.

The first inclining section 211 and the second inclining section 212 face each other in the direction +Z. The first inclining section 211 is located in a position facing in the direction −Z or on the side facing the front surface section 23, and the second inclining section 212 is located in a position facing in the direction +Z or on the side facing the rear surface section 24.

In detail, the first inclining section 211 inclines toward the negative side of the direction Y, which is the side facing the bottom surface section 22, in the direction from a portion of the top surface section 21, a portion facing the front surface section 23, toward the positive side of the direction Z, which is the side facing the rear surface section 24.

The second inclining section 212 inclines toward the positive side of the direction Y, which is the direction away from the bottom surface section 22, in the direction from the +Z-direction end of the first inclining section 211 toward the positive side of the direction Z.

The recess 213 is provided in the first inclining section 211. The recess 213 is formed so as to incline toward the negative sides of the directions Z and Y.

The image opening 214 is an opening through which image light outputted from a projection optical apparatus 4 passes. The reason why the second inclining section 212 is provided continuously with the first inclining section 211, where the image aperture 214 is located, is to prevent the light having exited via the image aperture 214 from being blocked by the structure of the top surface section 21.

Internal Configuration of Projector

Figure 3:
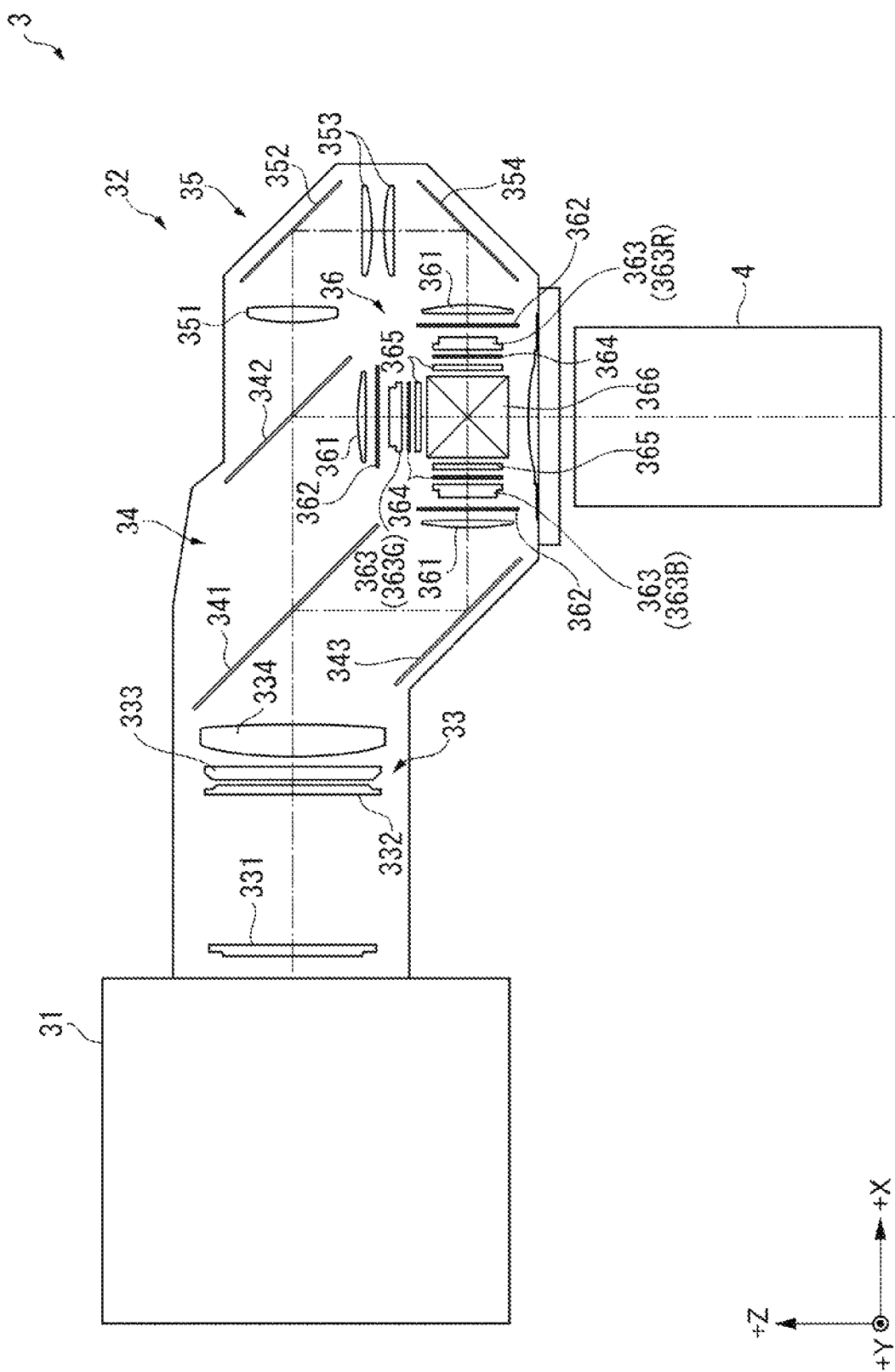
FIG. 3 is a diagrammatic view showing the configuration of an image projection apparatus in the first embodiment.

FIG. 3 is a diagrammatic view showing the configuration of an image projection apparatus 3.

In addition to the exterior enclosure 2, the projector 1 includes the image projection apparatus 3 accommodated in the exterior enclosure 2, as shown in FIG. 3. The projector 1 further includes, although not shown, a power supply, a cooler, and a controller accommodated in the exterior enclosure 2 in addition to the image projection apparatus 3. The power supply supplies electronic parts that form the projector 1 with electric power. The cooler cools cooling targets that form the projector 1. The controller controls the operation of the projector 1.

Configuration of Image Projection Apparatus

The image projection apparatus 3 projects image light that forms an image according to image information inputted from the controller. The image projection apparatus 3 includes a light source 31, an image generator 32, and a projection optical apparatus 4.

Configuration of Light Source

The light source 31 outputs light to a homogenizer 33 of the image generator 32. The configuration of the light source 31 may, for example, include a solid-state light source that outputs blue light that is excitation light and a wavelength converter that converts in terms of wavelength part of the blue light outputted from the solid-state light source into fluorescence containing green light and red light. The configuration of the light source 31 may instead, for example, include a light source lamp, such as an ultrahigh pressure mercury lamp, as the light source and may still instead include solid-state light sources that individually output blue light, green light, and red light.

Configuration of Image Generator

The image generator 32 modulates the light outputted from the light source 31 to generate image light according to the image information inputted from the controller. The image generator 32 includes the homogenizer 33, a color separator 34, a relay section 35, and an image formation section 36.

The homogenizer 33 homogenizes the light outputted from the light source 31. The homogenized light travels via the color separator 34 and the relay section 35 and illuminates a modulation region of each light modulator 363, which will be described later. The homogenizer 33 includes two lens arrays 331 and 332, a polarization converter 333, and a superimposing lens 334.

The color separator 34 separates the light incident from the homogenizer 33 into the red light, the green light, and the blue light. The color separator 34 includes two dichroic mirrors 341 and 342 and a reflection mirror 343, which reflects the blue light separated by the dichroic mirror 341.

The relay section 35 is provided in the optical path of the red light, which is longer than the optical paths of the green light and the blue light, and suppresses loss of the red light. The relay section 35 includes a light-incident-side lens 351, relay lenses 353, reflection mirrors 352 and 354. In the present embodiment, the relay section 35 is provided in the optical path of the red light, but not necessarily. For example, the blue light may be configured to have an optical path longer than those of the red light and the green light, and the relay section 35 may be provided in the optical path of the blue light.

The image formation section 36 modulates the red light, the green light, and the blue light incident thereon and combines the modulated red light, green light, and blue light with one another to form image light. The image formation section 36 includes three field lenses 361, three light-incident-side polarizers 362, three light modulators 363, three viewing angle compensators 364, and three light-exiting-side polarizers 365, which are provided in accordance with the incident red light, green light, and blue light, and one light combiner 366.

The light modulators 363 modulate the light outputted from the light source 31. The three light modulators 363 include a light modulator 363R, which modulates the red light, a light modulator 363G, which modulates the green light, and a light modulator 363B, which modulates the blue light. The light modulators 363 are each formed of a transmissive liquid crystal panel, and the light-incident-side polarizers 362, the light modulators 363, and the light-exiting-side polarizers 365 form liquid crystal light valves.

The light combiner 366 combines the blue light modulated by the light modulator 363B, the green light modulated by 363G, and the red light modulated by 363R with one another to form image light and outputs the formed image light to the projection optical apparatus 4. In the present embodiment, the light combiner 366 is formed of a cross dichroic prism and can instead be formed, for example, of a plurality of dichroic mirrors.

Configuration of Projection Optical Apparatus

The projection optical apparatus 4 is a projection lens that projects the image light generated by the image generator 32 onto the projection receiving surface PS. That is, the projection optical apparatus 4 projects the light modulated by the light modulators 363. The projection optical apparatus 4 reflects the image light incident in the direction −Z from the image generator 32 in the directions +Z and +Y and widens the angle of the image light.

The light modulators 363 are disposed in the demagnifying-side image formation plane of the projection optical apparatus 4.

The projection receiving surface PS is disposed in the magnifying-side image formation plane of the projection optical apparatus 4. The final image is projected on the projection receiving surface PS.

Figure 4:
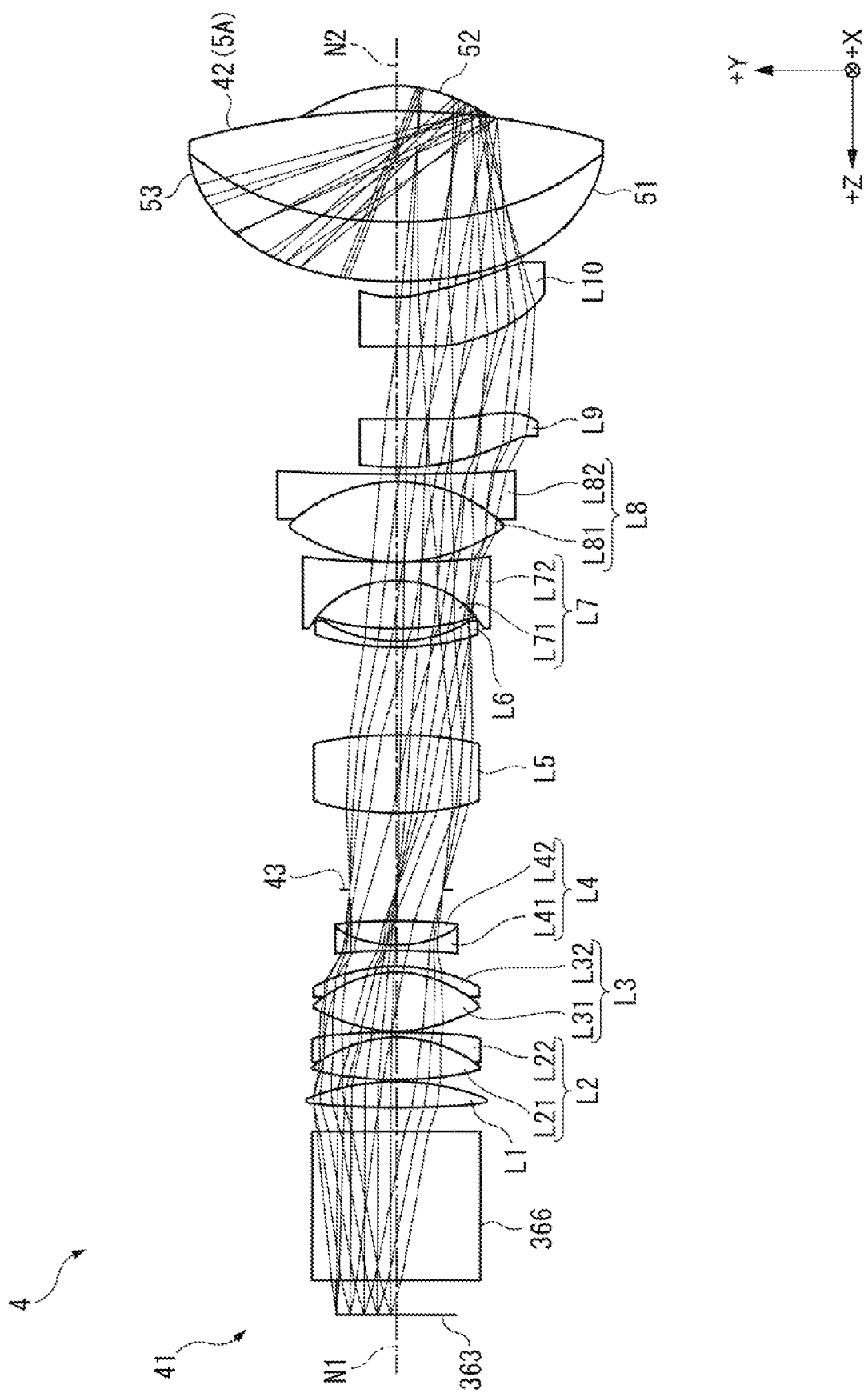
FIG. 4 is a diagrammatic view showing the configuration of a projection optical apparatus in the first embodiment.

FIG. 4 is a diagrammatic view showing the configuration of the projection optical apparatus 4. In other words, FIG. 4 is a beam diagram showing beams passing through the projection optical apparatus 4.

The projection optical apparatus 4 includes a first optical system 41, a second optical system 42, and an aperture 43, as shown in FIG. 4.

A first optical axis N1 of the first optical system 41 and a second optical axis N2 of a reflection surface 52 of the second optical system 42 extend in the direction +Z. The light modulators 363 form a projection image in a position shifted in the direction +Y from the first optical axis N1 of the first optical system 41. The projection receiving surface PS is installed in a position shifted in the direction +Y from the first optical axis N1 of the first optical system 41.

Configuration of First Optical System

The first optical system 41 is a refractive optical system including a plurality of lenses L1, L2, L3, L4, L5, L6, L7, L8, L9, and L10.

The lenses L1 to L10 are arranged in the presented order from the demagnifying side toward the magnifying side. In the present embodiment, the lens L2 is a joined lens formed of a lens L21 and a lens L22 joined to each other. The lens L3 is a joined lens formed of a lens L31 and a lens L32 joined to each other. The lens L4 is a joined lens formed of a lens L41 and a lens L42 joined to each other. The lens L7 is a joined lens formed of a lens L71 and a lens L72 joined to each other. The lens L8 is a joined lens formed of a lens L81 and a lens L82 joined to each other. The aperture 43 is disposed between the lens L4 and the lens L5.

In the first optical system 41, the lens L10, which is located in a position closest to the magnifying side, has aspheric surfaces both on the magnifying and demagnifying sides. In the first optical system 41, the lens L9, which is the second lens next to the lens closest to the magnifying side, also has aspheric surfaces both on the magnifying and demagnifying sides.

In the first optical system 41, the lens L9 has positive power. The first optical system 41 as a whole has positive power. Therefore, between the first optical system 41 and the second optical system 42, the distance between the chief rays decreases as they approach the second optical system 42.

Configuration of the Second Optical System

The second optical system 42 reflects and magnifies the image light incident from the first optical system 41. In the present embodiment, the second optical system 42 is formed of one optical element 5A. That is, the projection optical apparatus 4 includes the optical element 5A.

The optical element 5A is disposed on the first optical axis N1 of the first optical system 41. The optical element 5A has a first transmission surface 51, a reflection surface 52, and a second transmission surface 53 sequentially arranged from the demagnifying side toward the magnifying side.

In the optical element 5A, the second optical axis N2 of the reflection surface 52 coincides with the first optical axis N1.

The first transmission surface 51 is a −Y-direction region of a surface of the optical element 5A, the surface facing the first optical system 41. The first transmission surface 51 is a convexly curved surface protruding toward the demagnifying side. The first transmission surface 51 transmits the image light incident from the first optical system 41 into the optical element 5A. In other words, the first transmission surface 51 is a light incident surface of the optical element 5A, the surface on which the image light is incident from the first optical system 41.

The reflection surface 52 is a reflection coating layer provided on a surface of the optical element 5A, the surface opposite from the first transmission surface 51. The reflection surface 52 is provided on a convex portion of the optical element 5A, the portion protruding in the direction −Z from the surface opposite from the first optical system 41, and has a concavely curved shape. The reflection surface 52 magnifies the image light having entered the optical element 5A via the first transmission surface 51 while reflecting the image light in the directions +Y and +Z.

The second transmission surface 53 is a +Y-direction region of a surface of the optical element 5A, the surface facing the first optical system 41. That is, the second transmission surface 53 is a convexly curved surface protruding toward the magnifying side. The second transmission surface 53 transmits the image light reflected off the reflection surface 52 and traveling through the interior of the optical element 5A and causes the image light to exit out of the optical element 5A. In other words, the second transmission surface 53 is a light exiting surface via which the optical element 5A outputs the image light. In the present embodiment, the first transmission surface 51 and the second transmission surface 53 are formed at the same surface of the optical element 5A. That is, the first transmission surface 51 and the second transmission surface 53 are formed at a surface of the optical element 5A, the surface facing the first optical system 41.

The optical element 5A is designed by using the second optical axis N2 of the reflection surface 52 as the axis in the design stage. In other words, the second optical axis N2 is the design-stage optical axis of the first transmission surface 51, the reflection surface 52, and the second transmission surface 53.

The first transmission surface 51 and the reflection surface 52 are disposed in positions shifted in the direction −Y from the second optical axis N2, and the second transmission surface 53 is disposed in a position shifted in the direction +Y from the second optical axis N2.

In the present disclosure, the first transmission surface 51, the reflection surface 52, and the second transmission surface 53 of the optical element 5A each have a rotationally symmetric shape around the second optical axis N2. The first transmission surface 51, the reflection surface 52, and the second transmission surface 53 are each provided within an angular range of 180° around the second optical axis N2.

The first transmission surface 51, the reflection surface 52, and the second transmission surface 53 are each an aspheric surface. The first transmission surface 51, the reflection surface 52, and the second transmission surface 53 may instead each be a free-form surface. The free-form surface is one form of the shape of an aspheric surface. In this case, the free-form surface is designed by using the second optical axis N2 as the design-stage axis. Therefore, also in the case where one of the first transmission surface 51, the reflection surface 52, and the second transmission surface 53 is a free-form surface in the projection optical apparatus 4, the second optical axis N2 of the reflection surface 52 is called the optical axis of the optical element 5A.

Members that Form Optical Element

Figure 5:
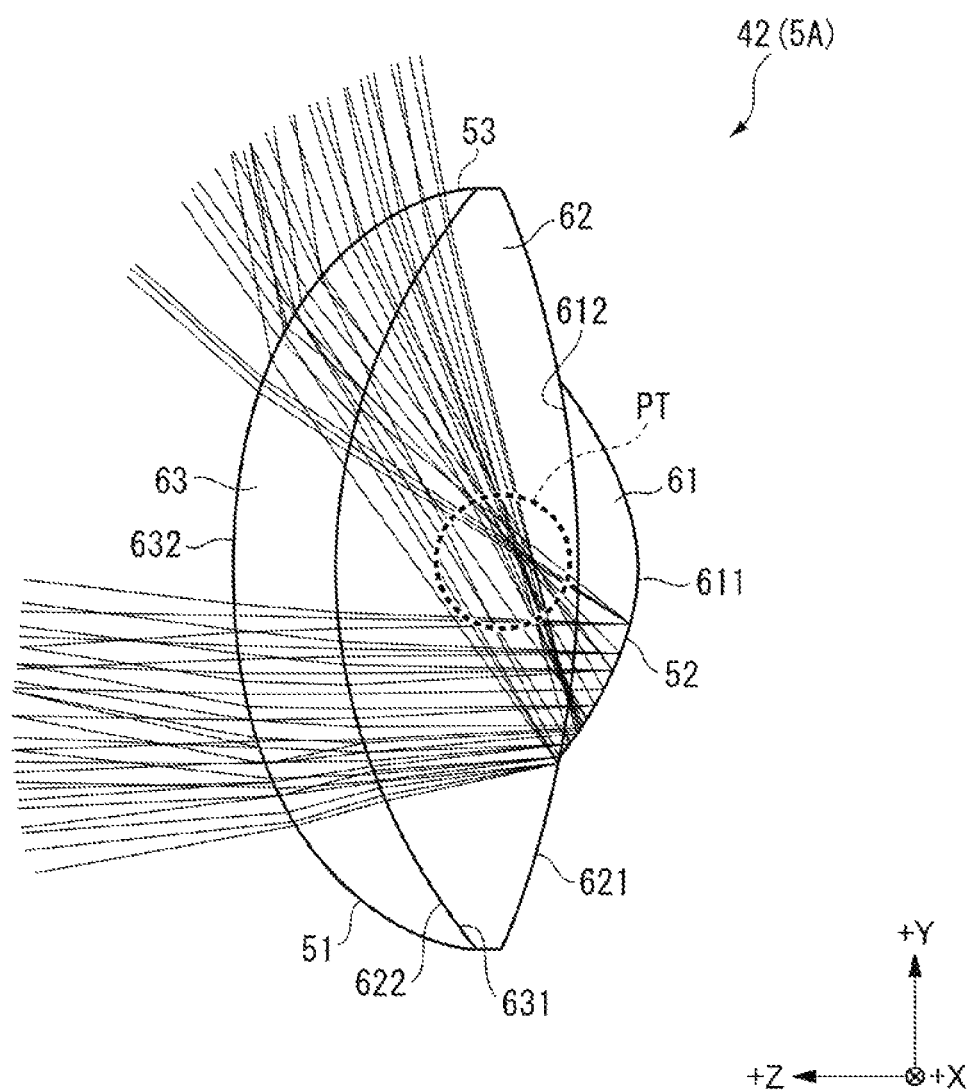
FIG. 5 is an enlarged diagrammatic view showing an optical element in the first embodiment.

FIG. 5 is an enlarged diagrammatic view showing the optical element 5A.

The optical element 5A includes a first light-transmissive member 61, a second light-transmissive member 62, and a third light-transmissive member 63. In addition, although not shown in FIG. 5, the optical element 5A includes a first joining member 64, a second joining member 65, and a spacer 66 (see FIG. 6). The first joining member 64, the second joining member 65, and the spacer 66 are provided between the first light-transmissive member 61 and the second light-transmissive member 62. The optical element 5A further includes a third joining member 67, a fourth joining member 68, and a spacer 69 (see FIG. 7).

Configuration of First Light-Transmissive Member

The first light-transmissive member 61 is disposed in the optical element 5A on the side opposite from the first optical system 41 with the second light-transmissive member and the third light-transmissive member 63 interposed therebetween. That is, the first light-transmissive member 61 is disposed in the optical element 5A in a position closest to the negative side of the direction Z. In other words, the first light-transmissive member 61 is disposed on the magnifying side of the second light-transmissive member 62 and the third light-transmissive member 63.

The first light-transmissive member 61 is a light-transmissive member made of a first resin and is a lens in the present embodiment. The first resin is a resin material containing a cycloolefin polymer as the primary component, but not necessarily. The first resin may instead be another transparent optical resin material. Other examples of the transparent optical resin material may include a resin material containing an acrylic resin, such as polycarbonate and polymethylmethacrylate.

The first light-transmissive member 61 has a first surface 611, which faces in the direction −Z, and a second surface 612, which is provided on the side opposite from the first surface 611. That is, the first surface 611 of the first light-transmissive member 61 is disposed on the magnifying side, and the second surface 612 of the first light-transmissive member 61 is disposed on the demagnifying side.

The first surface 611 is a convexly curved surface protruding in the direction −Z and has an aspherical shape. A reflection layer is formed at the first surface 611, and the first surface 611 thus forms the reflection surface 52 of the optical element 5A. The reflection surface 52 widens the angle of the image light incident thereon while reflecting the image light in the directions +Y and +Z. In this process, the image light reflected off the reflection surface 52 is focused at a predetermined focused light section PT in the optical element 5A and then travels in the directions +Y and +Z with the angle of the image light widened. In the present embodiment, the focused light section PT is provided in the second light-transmissive member 62. That is, the first surface 611 of the first light-transmissive member 61 focuses the light incident thereon in the second light-transmissive member 62.

The second surface 612 corresponds to a first joint surface. The second surface 612 is a surface facing a first surface 621 of the second light-transmissive member 62 and is a spherical, concavely curved surface facing in the direction +Z. The second surface 612 is joined to the first surface 621 of the second light-transmissive member 62 via the first joining member 64 and the second joining member 65 (see FIG. 6).

Configuration of Second Light-Transmissive Member

The second light-transmissive member 62 is a lens disposed in a position shifted in the direction +Z from the first light-transmissive member 61. In other words, the second light-transmissive member 62 is disposed between the first light-transmissive member 61 and the third light-transmissive member 63 in the direction +Z. That is, the second light-transmissive member 62 is disposed on the demagnifying side of the first light-transmissive member 61 and on the magnifying side of the third light-transmissive member 63. The outer diameter of the second light-transmissive member 62 is greater than the outer diameter of the first light-transmissive member 61. The second light-transmissive member 62 has the first surface 621 facing in the direction −Z and a second surface 622 provided on the side opposite from the first surface 621. That is, the first surface 621 of the second light-transmissive member 62 is disposed on the magnifying side, and the second surface 622 of the second light-transmissive member 62 is disposed on the demagnifying side.

The first surface 621 corresponds to a second joint surface. The first surface 621 is a surface facing the second surface 612 of the first light-transmissive member 61 and is a spherical, convexly curved surface protruding in the direction −Z. The first surface 621 is joined to the second surface 612 via the first joining member 64 and the second joining member 65 (see FIG. 6).

The second surface 622 corresponds to a fourth joint surface. The second surface 622 is a spherical, convexly curved surface protruding in the direction +Z, as the second surface 612. The second surface 622 is joined to a first surface 631 of the third light-transmissive member 63 via the third joining member 67 and the fourth joining member 68 (see FIG. 7).

As described above, the focused light section PT, where the image light reflected off the reflection surface 52 is focused is provided in the second light-transmissive member 62. In the focused light section PT, where the optical density is high, the temperature tends to be high and the optical characteristics are likely to change.

In contrast, the second light-transmissive member 62 is made of a material different from that of the first light-transmissive member 61. In detail, the second light-transmissive member 62 is made of a material that is less likely to deteriorate by light and heat than the material of which the first light-transmissive member 61 is made. That is, the heat resistance of the second light-transmissive member is higher than the heat resistance of the first light-transmissive member 61. Furthermore, the optical transmittance of the second light-transmissive member 62 is higher than the optical transmittance of the first light-transmissive member 61. Specifically, the second light-transmissive member 62 is made of glass. The thus formed second light-transmissive member 62 can suppress changes in the optical characteristics thereof and in turn changes in the optical characteristics of the optical element 5A due to the deformation or transformation of the second light-transmissive member 62. The heat resistance of the second light-transmissive member 62 is higher than the heat resistance of the third light-transmissive member 63, which will be described later. Furthermore, the optical transmittance of the second light-transmissive member 62 is higher than the optical transmittance of the third light-transmissive member 63.

Configuration of Third Light-Transmissive Member

The third light-transmissive member 63 is a lens disposed in the optical element 5A in a position closest to the first optical system 41. That is, the third light-transmissive member 63 is disposed on the side opposite from the first light-transmissive member 61 with the second light-transmissive member 62 interposed therebetween. In other words, the third light-transmissive member 63 is disposed on the demagnifying side of the first light-transmissive member 61 and the second light-transmissive member 62. The outer diameter of the third light-transmissive member 63 is substantially equal to the outer diameter of the second light-transmissive member 62. The third light-transmissive member 63 has the first surface 631, which faces in the direction −Z, and a second surface 632, which is provided on the side opposite from the first surface 631. That is, the first surface 631 of the third light-transmissive member 63 is disposed on the magnifying side, and the second surface 632 of the third light-transmissive member 63 is disposed on the demagnifying side.

The first surface 631 corresponds to a third joint surface. The first surface 631 is a spherical, concavely curved surface facing in the direction −Z. The first surface 631 is joined to the second surface 622 of the second light-transmissive member 62 via the third joining member 67 and the fourth joining member 68 (see FIG. 7).

The second surface 632 is a convexly curved surface protruding in the direction +Z. The −Y-direction region of the second surface 632 is the first transmission surface 51, and the +Y-direction region of the second surface 632 is the second transmission surface 53. The second surface 632 has an aspheric shape as described above.

The third light-transmissive member 63 is made of a second resin. The second resin may be made of the same resin material as that of the first resin or a different resin material from that of the first resin.

Configuration of First Joining Member

Figure 6:
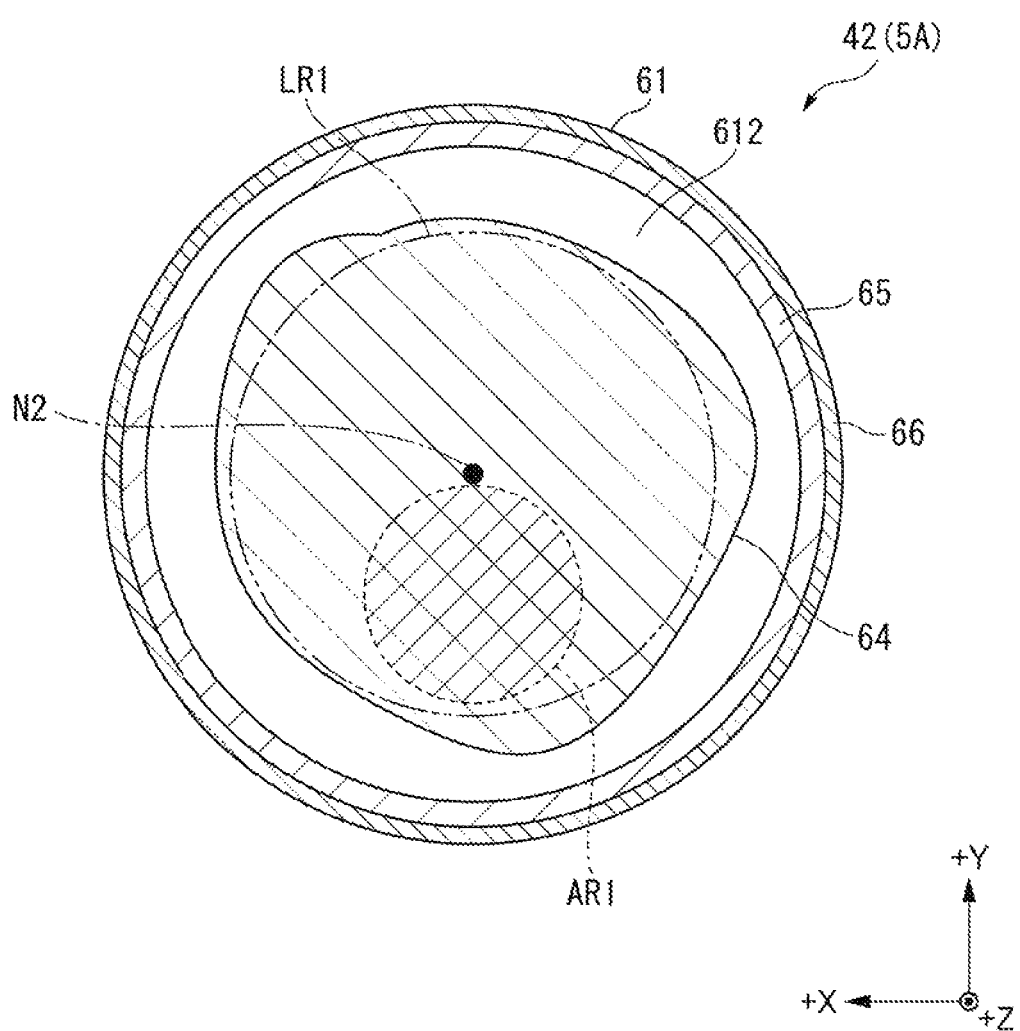
FIG. 6 is a diagrammatic view of a first joining member, a second joining member, and a spacer in the first embodiment.

FIG. 6 is a diagrammatic view of the first joining member 64, the second joining member 65, and the spacer 66 provided at the second surface 612 of the first light-transmissive member 61 and viewed in the direction −Z.

The first joining member 64 joins the second surface 612 of the first light-transmissive member 61 as the first joint surface to the first surface 621 of the second light-transmissive member 62 as the second joint surface.

The first joining member 64 joins the second surface 612 and the first surface 621 to each other over an entire light passage region AR1, where the light passes through the second surface 612 and the first surface 621, as shown in FIG. 6. That is, the first joining member 64 covers the entire light passage region AR1, where the light passes through the first surface 621, when viewed in the direction −Z. Although not illustrated, the first joining member 64 covers the entire light passage region AR1, where the light passes through the second surface 612, when viewed in the direction +Z. In detail, the first joining member 64 is disposed in the smaller one of an effective diameter region of the first light-transmissive member 61 and the effective diameter region of the second light-transmissive member 62. In the present embodiment, the effective diameter region of the first light-transmissive member 61 is smaller than the effective diameter region of the second light-transmissive member 62, so that the first joining member 64 is disposed in an effective diameter region LR1 of the first light-transmissive member 61, as shown in FIG. 6. That is, the first joining member 64 is disposed so as to cover the entire effective diameter region LR1 of the first light-transmissive member 61 when viewed in the direction +Z.

The first joining member 64 is made of a silicone adhesive (first adhesive). The silicone adhesive of which the first joining member 64 is made is an adhesive containing a dimethyl-based silicone adhesive as the primary component, but not necessarily. The first joining member 64 may instead be made of another silicone adhesive, for example, an adhesive containing a phenyl-based silicone adhesive as the primary component.

The light resistance and heat resistance of a silicone adhesive are higher than those of other adhesives, such as ene-thiol-based adhesives. That is, a silicone adhesive is less likely to deteriorate due to light and heat than other adhesives.

The first joining member 64 made of a silicone adhesive and provided in accordance with the light passage region AR1 is therefore unlikely to deteriorate due to light. The first light-transmissive member 61 and the second light-transmissive member 62 can thus be stably joined to each other.

Furthermore, the refractive index of a silicone adhesive is close to the refractive index of the cycloolefin polymer contained in the first light-transmissive member 61 and the refractive index of the glass contained in the second light-transmissive member 62. A situation in which the joining member between the first light-transmissive member 61 and the second light-transmissive member 62 has a refractive index greatly different from the refractive indices of the first light-transmissive member 61 and the second light-transmissive member 62 can therefore be avoided. Changes in the optical characteristics of the optical element 5A due to the first joining member 64 can thus be suppressed, whereby deterioration of the imaging performance of the projection optical apparatus 4 can be suppressed.

A dimethyl-based silicone adhesive tends to maintain the short-wavelength-light transmittance as compared with a phenyl-based silicone adhesive when the adhesives absorb moisture in the air. The first joining member 64 containing a dimethyl-based silicone adhesive as the primary component can therefore suppress deterioration of the optical element 5A.

Configuration of Second Joining Member

The second joining member 65, along with the first joining member 64, joins the second surface 612 of the first light-transmissive member 61 as the first joint surface to the first surface 621 of the second light-transmissive member 62 as the second joint surface. The second joining member 65 is disposed outside the smaller one of the effective diameter region of the first light-transmissive member 61 and the effective diameter region of the second light-transmissive member 62. In detail, the second joining member 65 is disposed outside the first joining member 64 when viewed in the direction +Z. That is, the second joining member 65 is disposed outside the first joining member 64 and outside the effective diameter region LR1 of the first light-transmissive member 61 when viewed in the direction +Z. The image light having entered the optical element 5A is therefore not incident on the second joining member 65.

The second joining member 65 is provided along the outer circumferential edge of the effective diameter region LR1. That is, the second joining member 65 is provided in an annular shape around the second optical axis N2 when viewed in the direction +Z.

The second joining member 65 is made of an adhesive (second adhesive) having adhesiveness higher than the adhesiveness of the silicone adhesive of which the first joining member 64 is made. An epoxy-based adhesive is used as the second adhesive by way of example.

Configuration of Spacer

The spacer 66 corresponds to the first spacer in the present disclosure. The spacer 66 is disposed between the first light-transmissive member 61 and the second light-transmissive member 62 and maintains the distance between the first light-transmissive member 61 and the second light-transmissive member 62 substantially constant. Specifically, the spacer 66 is provided between the second surface 612 and the first surface 621 when the second surface 612 and the first surface 621 are joined to each other by the first joining member 64 and the second joining member 65 and maintains the distance between the second surface 612 and the first surface 621 substantially constant. That is, the spacer 66 is in contact with the second surface 612 and the first surface 621.

By providing the thus configured spacer 66, an increase in the dimension of at least one of the first light-transmissive member 61 and the second light-transmissive member 62 that expands due to heat can be ensured between the second surface 612 and the first surface 621. The spacer 66 can further suppress changes in the optical characteristics of the optical element 5A due to variation in the film thickness of the first joining member 64 and the film thickness of the second joining member 65.

In the present embodiment, the planar size of the first light-transmissive member 61 when viewed in the direction +Z is smaller than the planar size of the second light-transmissive member 62 when viewed in the direction −Z. The spacer 66 is therefore provided in accordance with the outer circumferential edge of the second surface 612 of the first light-transmissive member 61. That is, the spacer 66 is provided outside the light passage region AR1, where the light passes through the first surface 621 and the second surface 612, and outside the effective diameter region LR1 of the first light-transmissive member 61. Furthermore, the spacer 66 is made of metal, formed in an annular shape, and disposed outside the second joining member 65 when viewed in the direction +Z. That is, the spacer 66 is disposed outside the first joining member 64 when viewed in the direction +Z.

The spacer 66 may be an adhesive containing particles made of resin or metal. The spacer 66 may be provided between the first joining member 64 and the second joining member 65 or may be partially provided along the outer circumferential edge of the second surface 612.

Configuration of Third Joining Member

Figure 7:
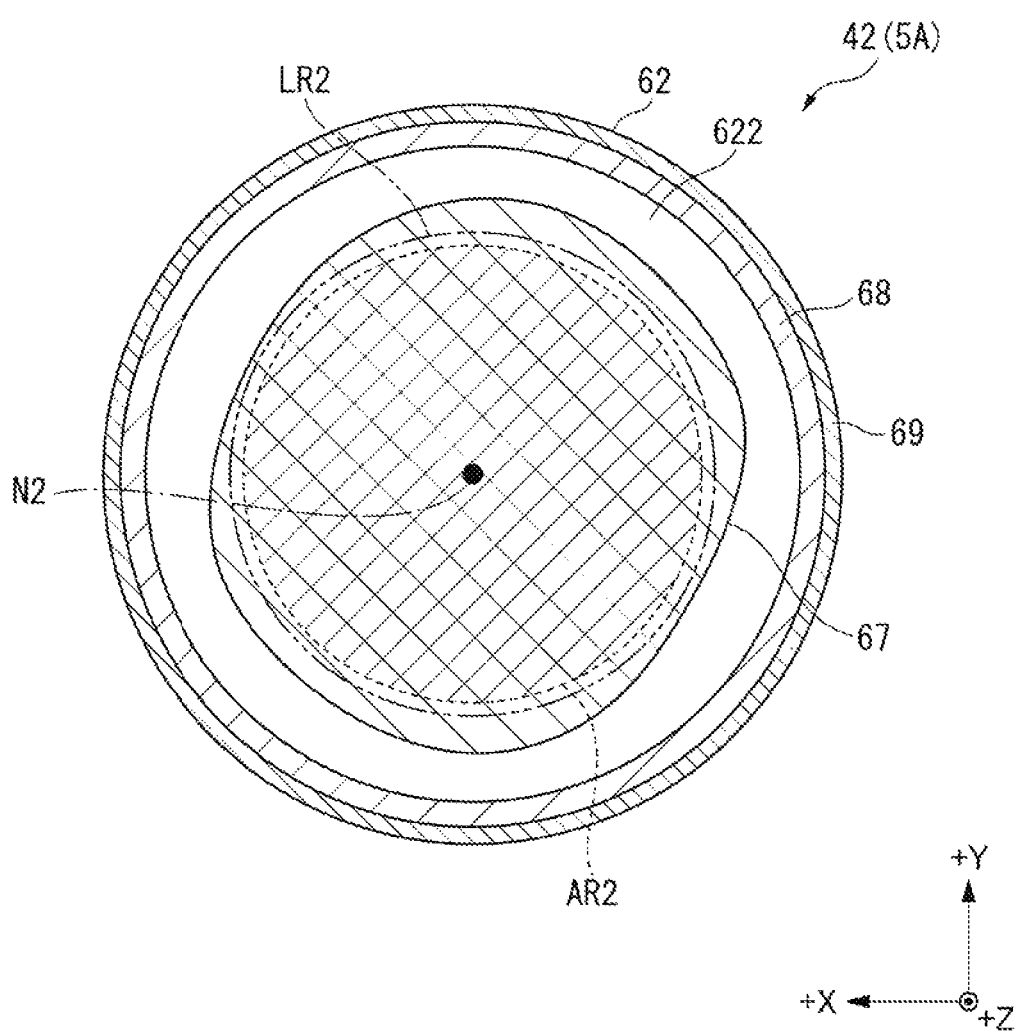
FIG. 7 is a diagrammatic view of a third joining member, a fourth joining member, and a spacer in the first embodiment.

FIG. 7 is a diagrammatic view of the third joining member 67, the fourth joining member 68, and the spacer 69 provided at the second surface 622 of the second light-transmissive member 62 when viewed in the direction +Z.

The third joining member 67 joins the second surface 622 of the second light-transmissive member 62 as the fourth joint surface to the first surface 631 of the third light-transmissive member 63 as the third joint surface.

The third joining member 67 joins the second surface 622 and the first surface 631 to each other over an entire light passage region AR2, where the light passes through the second surface 622 and the first surface 631, as shown in FIG. 7. That is, the third joining member 67 covers the entire light passage region AR2, where the light passes through the second surface 622 when viewed in the direction +Z. Although not illustrated, the third joining member 67 covers the entire light passage region AR2, where the light passes through the first surface 631 when viewed in the direction −Z. In detail, the third joining member 67 is disposed in the smaller one of the effective diameter region of the second light-transmissive member 62 and the effective diameter region of the third light-transmissive member 63. In the present embodiment, the effective diameter region of the second light-transmissive member 62 and the effective diameter region of the third light-transmissive member 63 have substantially the same size, so that either of the effective diameter region of the second light-transmissive member 62 or the effective diameter region of the third light-transmissive member 63 may be the smaller one. The third joining member 67 is therefore disposed, for example, in the effective diameter region LR2 of the second light-transmissive member 62. That is, the third joining member 67 is disposed so as to cover the entire effective diameter region LR2 of the second light-transmissive member 62 when viewed in the direction +Z.

The third joining member 67 is made of a silicone adhesive, as the first joining member 64. The thus configured third joining member 67 joins the second light-transmissive member 62 made of glass and the third light-transmissive member 63 made of the first resin containing a cycloolefin polymer, whereby changes in the optical characteristics of the optical element 5A can be suppressed. Deterioration of the imaging performance of the projection optical apparatus 4 can therefore be suppressed.

The silicone adhesive of which the third joining member 67 is made is an adhesive containing a dimethyl-based silicone adhesive as the primary component. The thus formed third joining member 67 is likely to maintain the transmittance at which short-wavelength light in the visible wavelength range passes through the optical element 5A, whereby deterioration of the optical element 5A can be effectively suppressed. The second joining member 65 may, however, not necessarily be made of the adhesive described above and may instead be made of another silicone adhesive, for example, an adhesive containing a phenyl-based silicone adhesive as the primary component. The composition of the first joining member 64 and the composition of the third joining member 67 may be the same or differ from each other.

Configuration of Fourth Joining Member

The fourth joining member 68, along with the third joining member 67, joins the second surface 622 of the second light-transmissive member 62 as the fourth joint surface to the first surface 631 of the third light-transmissive member 63 as the third joint surface. The fourth joining member 68 is disposed outside the smaller one of the effective diameter region of the second light-transmissive member 62 and the effective diameter region of the third light-transmissive member 63. In detail, the fourth joining member 68 is disposed outside the third joining member 67 when viewed in the direction +Z. That is, the fourth joining member 68 is disposed outside the effective diameter region LR2 of the second light-transmissive member 62 and outside the third light joining member 67 when viewed in the direction +Z. The image light having entered the optical element 5A is therefore not incident on the fourth joining member 68.

The fourth joining member 68 is provided along the outer circumferential edge of the effective diameter region LR2. That is, the fourth joining member 68 is provided in an annular shape around the second optical axis N2 when viewed in the direction +Z.

The fourth joining member 68 is made of the second adhesive having adhesiveness higher than the adhesiveness of the silicone adhesive of which the third joining member 67 is made. An epoxy-based adhesive is used as the second adhesive by way of example, as described above.

Configuration of Spacer

The spacer 69 is disposed between the second light-transmissive member 62 and the third light-transmissive member 63 and maintains the distance between the second light-transmissive member 62 and the third light-transmissive member 63 substantially constant. Specifically, the spacer 69 is provided between the second surface 622 and the first surface 631 when the second surface 622 and the first surface 631 are joined to each other by the third joining member 67 and the fourth joining member 68 and maintains the distance between the second surface 622 and the first surface 631 substantially constant. That is, the spacer 69 is in contact with the second surface 622 and the first surface 631.

By providing the thus configured spacer 69, an increase in the dimension of at least one of the second light-transmissive member 62 and the third light-transmissive member 63 that expands due to heat can be ensured between the second surface 622 and the first surface 631. The spacer 69 can further suppress changes in the optical characteristics of the optical element 5A due to variation in the film thickness of the third joining member 67 and the film thickness of the fourth joining member 68.

In the present embodiment, the spacer 69 is provided in accordance with the outer circumferential edge of the second surface 622 or the outer circumferential edge of the first surface 631. That is, the spacer 69 is provided outside the light passage region AR2, where the light passes through the second surface 622 and the first surface 631, and outside the effective diameter region LR2 of the second light-transmissive member 62. Furthermore, the spacer 69 is made of metal, formed in an annular shape, and disposed outside the fourth joining member 68 when viewed in the direction +Z.

The spacer 69 may be an adhesive containing particles made of resin or metal. The spacer 69 may be provided between the third joining member 67 and the fourth joining member 68 or may be partially provided along the outer circumferential edge of the second surface 622.

Effects of First Embodiment

The projector 1 according to the present embodiment described above provides the following effects.

The projector 1 includes the light source 31, the light modulators 363, which modulate the light outputted from the light source 31, and the projection optical apparatus 4, which projects the light modulated by the light modulators 363. The projection optical apparatus 4 projects the light incident thereon. The projection optical apparatus 4 includes the optical element 5A.

The optical element 5A includes the first light-transmissive member 61, the second light-transmissive member 62, the first joining member 64, and the second joining member 65. The first light-transmissive member 61 has the first surface 611 having an aspheric shape and the second surface 612 provided on the side opposite from the first surface 611 and is made of the first resin. The second surface 612 corresponds to the first joint surface. The second light-transmissive member 62 has the first surface 621 and is made of a material different from that of the first light-transmissive member 61. The first surface 621 corresponds to the second joint surface. The first joining member 64 and the second joining member 65 join the second surface 612 and the first surface 621 to each other. The first joining member 64 is made of a silicone adhesive and disposed in the effective diameter region LR1, which is the smaller one of the effective diameter region of the first light-transmissive member 61 and the effective diameter region of the second light-transmissive member 62. The second joining member 65 is made of an adhesive having adhesiveness higher than the adhesiveness of a silicone adhesive. The second joining member 65 is disposed outside the first joining member 64 and outside the effective diameter region LR1.

Silicone adhesives have higher light resistance and heat resistance than other adhesives. That is, silicone adhesives are unlikely to deteriorate due to light and heat. Furthermore, silicone adhesives cure and shrink by smaller amounts than other adhesives and absorb short-wavelength light in the visible wavelength range by smaller amounts than other adhesives.

Therefore, even when the light is incident on the first joining member 64, deformation, transformation, and other types of deterioration of the first joining member 64 can be suppressed.

The second joining member 65 is made of the second adhesive having adhesiveness higher than the adhesiveness of the first adhesive of which the first joining member 64 is made. The first light-transmissive member 61 and the second light-transmissive member 62 can therefore be joined to each other at increased joining strength. In addition, the second joining member 65 is disposed outside the effective diameter region LR1 of the first light-transmissive member 61. Entry of the light into the second joining member 65 can thus be suppressed, whereby deterioration of the second joining member 65 due to the light can be suppressed.

Therefore, the first light-transmissive member 61 and the second light-transmissive member 62 can be stably joined to each other, and changes in the optical characteristics of the optical element 5A can be suppressed. Furthermore, the amount of light passing through the optical element 5A can be increased. Deterioration of the imaging performance of the projection optical apparatus 4 can thus be suppressed, whereby a projector 1 capable of stably projecting an image can be achieved.

The optical element 5A includes the spacer 66 disposed between the second surface 612 and the first surface 621. The spacer 66 corresponds to the first spacer.

According to the configuration described above, even when at least one of the first light-transmissive member 61 and the second light-transmissive member 62 expands due to heat, the dimension corresponding to the expansion of the at least one of the light-transmissive members can be ensured between the second surface 612 and first surface and 621.

Furthermore, since the thickness of the first joining member 64 can be maintained substantially constant, changes in the optical characteristics of the optical element 5A due, for example, to variations in the thickness of the first joining member 64 can be suppressed.

In the optical element 5A, the spacer 66 is disposed outside the first joining member 64. That is, the spacer 66 is disposed outside the light passage region AR1, where the light passes through the second surface 612 and the first surface 621.

According to the configuration described above, a situation in which the spacer 66 blocks the image light passing through the second surface 612 and the first surface 621 can be avoided.

In the optical element 5A, the second light-transmissive member 62 is made of glass.

The refractive index of silicone resin is close to the refractive index of glass. The situation in which the joining member between the first light-transmissive member 61 and the second light-transmissive member 62 has a refractive index greatly different from the refractive indices of the first light-transmissive member 61 and the second light-transmissive member 62 can therefore be avoided. Changes in the optical characteristics of the optical element 5A can therefore be suppressed.

Furthermore, since the second light-transmissive member 62 is made of glass, deterioration of the second light-transmissive member 62 can be suppressed even when the second light-transmissive member 62 has a region having a relatively high optical density.

In the optical element 5A, the first surface 611 of the first light-transmissive member 61 focuses the light incident thereon in the second light-transmissive member 62.

According to the configuration described above, the first light-transmissive member 61 focuses the image light in the second light-transmissive member 62, so that a region where the optical density is locally high is created in the second light-transmissive member 62. Even in the case described above, since the second light-transmissive member 62 is made of glass, deterioration of the high optical density region in the second light-transmissive member 62 can be suppressed, whereby changes in the optical characteristics of the second light-transmissive member 62 and in turn the optical characteristics of the optical element 5A can be suppressed.

In the optical element 5A, the first resin of which the first light-transmissive member 61 is made is a resin material containing a cycloolefin polymer as the primary component.

The refractive index of silicone resin is close to the refractive index of cycloolefin polymer.

According to the configuration described above, the situation in which the joining member between the first light-transmissive member 61 and the second light-transmissive member 62 has a refractive index greatly different from the refractive indices of the first light-transmissive member 61 and the second light-transmissive member 62 can be avoided. Changes in the optical characteristics of the optical element 5A can therefore be suppressed.

In the optical element 5A, the silicone adhesive contained in the first joining member 64 contains a dimethyl-based silicone adhesive as the primary component.

A dimethyl-based silicone adhesive, even when having absorbed moisture in the ambient environment, absorbs only a small amount of short-wavelength light in the visible wavelength range and can therefore maintain high short-wavelength light transmittance. A decrease in the amount of light passing through the optical element 5A can therefore be suppressed.

The optical element 5A includes the third light-transmissive member 63 and the third joining member 67. The third light-transmissive member 63 has the first surface 631. The first surface 631 corresponds to the third joint surface. The third light-transmissive member 63 is made of the second resin and disposed on the side opposite from the first light-transmissive member 61 with the second light-transmissive member 62 interposed therebetween. The third joining member 67 joins the second light-transmissive member 62 and the third light-transmissive member 63 to each other. The second light-transmissive member 62 has the second surface 622, which is disposed on the side opposite from the first surface 621 and joined to the first surface 631 by the third joining member 67. The second surface 622 corresponds to the fourth joint surface. The third joining member 67 is made of a silicone adhesive of which the first joining member 64 is made. The third joining member 67 is disposed in the smaller one of the effective diameter region of the second light-transmissive member 62 and the effective diameter region of the third light-transmissive member 63 and joins the first surface 631 and the second surface 622 to each other.

The configuration described above allows the second light-transmissive member 62 and the third light-transmissive member 63 to be stably joined to each other. In addition, changes in the optical characteristics of the optical element 5A can be suppressed. Furthermore, the amount of light passing through the optical element 5A can be increased. Moreover, since the third light-transmissive member 63 is made of the second resin, the weight of the optical element 5A can be reduced as compared with a case where the third light-transmissive member 63 is made of glass.

Second Embodiment

A second embodiment of the present disclosure will next be described.

The projector according to the present embodiment has the same configuration as that of the projector 1 according to the first embodiment but differs therefrom in terms of the arrangement of the second joining member 65. In the following description, portions that are the same or substantially the same as the portions having been already described have the same reference characters and will not be described.

Schematic Configuration of Projector

Figure 8:
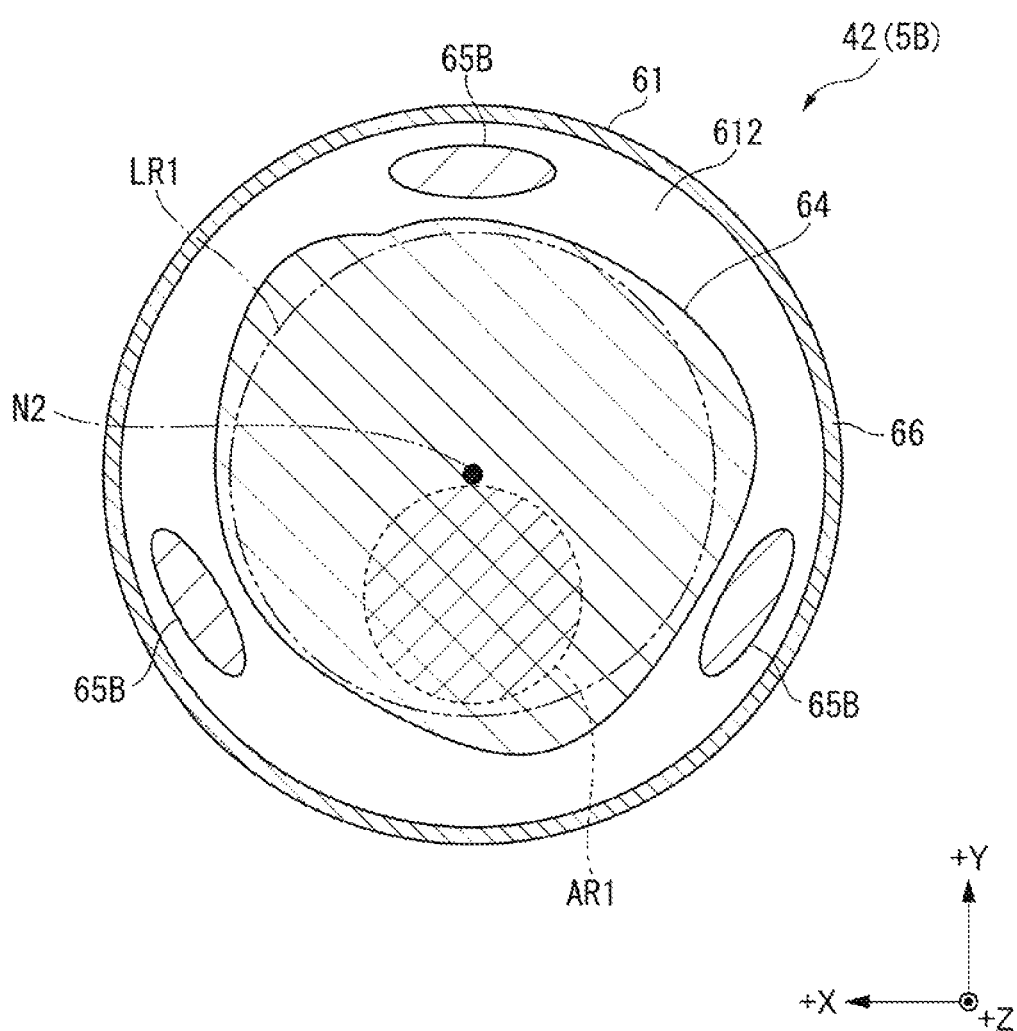
FIG. 8 is a diagrammatic view showing the first joining member, the second joining member, and the spacer of the optical element provided in the projector according to a second embodiment.

FIG. 8 is a diagrammatic view, viewed in the direction −Z, of the first joining member 64, a second joining member 65B, and the spacer 66 provided at the second surface 612 of the first light-transmissive member 61 of an optical element 5B provided in the projector according to the present embodiment.

The projector according to the present embodiment has the same configuration and function as those of the projector 1 according to the first embodiment except that the optical element 5A according to the first embodiment is replaced with the optical element 5B shown in FIG. 8. That is, the projection optical device 4 according to the present embodiment includes the optical element 5B shown in FIG. 8 in place of the optical element 5A according to the first embodiment.

Configuration of Optical Element

The optical element 5B has the same configuration and function as those of the optical element 5A according to the first embodiment except that the second joining member 65 according to the first embodiment is replaced with the second joining member 65B. That is, the optical element 5B includes the first light-transmissive member 61, the second light-transmissive member 62, the third light-transmissive member 63, the first joining member 64, the second joining member 65B, the spacer 66, and the third joining member 67, the fourth joining member 68, and the spacer 69.

The second joining member 65B joins the second surface 612 of the first light-transmissive member 61 to the first surface 621 of the second light-transmissive member 62 as the second joint surface, as the second joining member 65 does. The second surface 612 corresponds to the first joint surface, and the first surface 621 corresponds to the second joint surface, as described above. The second joining member 65B is disposed outside the first joining member 64 and outside the effective diameter region LR1 of the first light-transmissive member 61 when viewed in the direction +Z. The image light having entered the optical element 5A is therefore not incident on the second joining member 65B.

The second joining member 65B is formed of a plurality of second joining members 65B provided along the outer circumferential edge of the effective diameter region LR1. Specifically, three second joining members 65B are provided at equal intervals along the circumferential direction around the second optical axis N2 when viewed in the direction +Z, but not necessarily. The number of second joining members 65B can be changed as appropriate. The second joining members 65B are made of the second adhesive, as the second joining member 65.

The projector including the projection optical device 4 including the thus configured optical element 5B can provide the same effects as those provided by the projector 1 according to the first embodiment.

Out of the third joining member 67 and the fourth joining member 68, which join the second light-transmissive member 62 and the third light-transmissive member 63 to each other, the fourth joining member 68 may be provided in the same manner in which the second joining members 65B are provided.

Third Embodiment

A third embodiment of the present disclosure will next be described.

The projector according to the present embodiment has the same configuration as that of the projector 1 according to the first embodiment but differs therefrom in that the optical element provided in the projection optical apparatus has a groove. In the following description, portions that are the same or substantially the same as the portions having been already described have the same reference characters and will not be described.

Schematic Configuration of Projector

Figure 9:
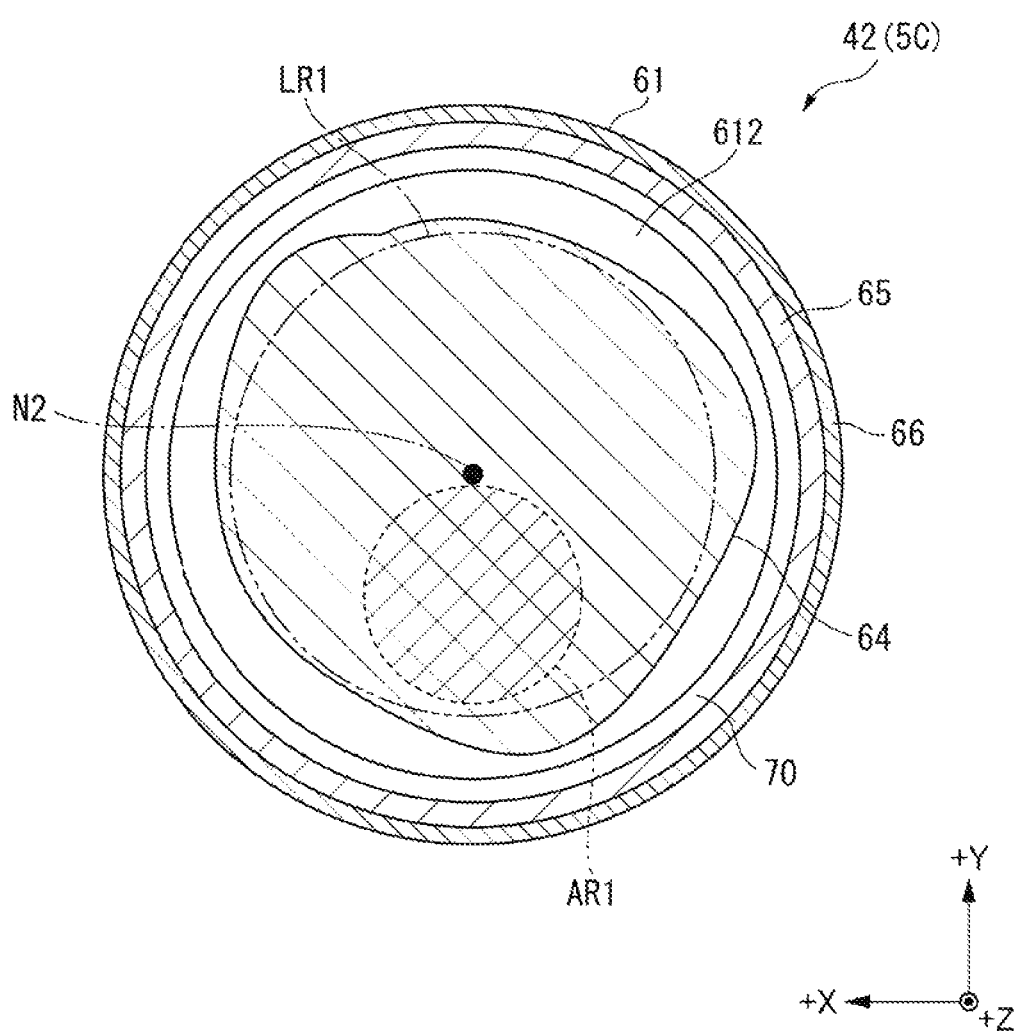
FIG. 9 is a diagrammatic view showing a groove of the optical element provided in the projector according to a third embodiment.

FIG. 9 is a diagrammatic view showing a groove 70 provided in the second surface 612 of the first light-transmissive member 61 of an optical element 5C provided in the projector according to the present embodiment.

The projector according to the present embodiment has the same configuration and function as those of the projector 1 according to the first embodiment except that the optical element 5A according to the first embodiment is replaced with the optical element 5C shown in FIG. 9. That is, the projection optical apparatus 4 according to the present embodiment includes the optical element 5C shown in FIG. 9 in place of the optical element 5A according to the first embodiment.

Configuration of Optical Element

The optical element 5C has the same configuration and function as those of the optical element 5A according to the first embodiment except that the optical element 5C further has the groove 70. That is, the optical element 5C includes the first light-transmissive member 61, the second light-transmissive member 62, the third light-transmissive member 63, the first joining member 64, the second joining member 65, the spacer 66, and the third joining member 67, the fourth joining member 68, the spacer 69, and the groove 70.

The groove 70 is provided between the first joining member 64 and the second joining member 65 and surrounds the first joining member 64. In detail, the groove 70 is formed in an annular shape surrounding the first joining member 64 with the second optical axis N2 as the center of the annular shape when viewed in the direction +Z.

In the present embodiment, the groove 70 is provided in the second surface 612 out of the second surface 612 and the first surface 621. That is, the second surface 612 as the first joint surface has the groove 70 provided between the first joining member 64 and the second joining member 65, and the groove 70 surrounds the first joining member 64, but not necessarily. The first surface 621 may have the groove 70, or the second surface 612 and the first surface 621 may each have the groove 70. The second surface 612 corresponds to the first joint surface, and the first surface 621 corresponds to the second joint surface.

A groove surrounding the third joining member 67 when viewed in the direction +Z may be provided in at least one of the second surface 622 of the second light-transmissive member 62 and the first surface 631 of the third light-transmissive member 63, as the groove 70 is. The second surface 622 corresponds to the fourth joint surface, and the first surface 631 corresponds to the third joint surface, as described above.

It has been assumed that the groove 70 is provided in an annular shape around the second optical axis N2, but not necessarily. The groove 70 may be formed of a plurality of grooves divided along the circumferential direction around the second optical axis N2. That is, the groove 70 may not be continuous along the circumferential direction around the second optical axis N2.

Furthermore, the optical element 5C may include the second joining members 65B presented in the second embodiment in place of the second joining member 65 and may further include the fourth joining member 68 provided in the same manner in which the second joining members 65B are provided.

Effects of Third Embodiment

The projector according to the present embodiment described above provides the effects below as well as the same effects provided by the projector 1 according to the first embodiment.

In the optical element 5C, at least one of the second surface 612 and the first surface 621 has the groove 70 provided between the first joining member 64 and the second joining member 65, and the groove 70 surrounds the first joining member 64.

The configuration described above can suppress mixture of the silicone adhesive of which the first joining member 64 is made and the adhesive of which the second joining member 65 is made in the effective diameter region LR1.

Fourth Embodiment

A fourth embodiment of the present disclosure will next be described.

The projector according to the present embodiment has the same configuration as that of the projector according to the second embodiment but differs therefrom in that grooves surrounding the second joining members 65B are provided. In the following description, portions that are the same or substantially the same as the portions having been already described have the same reference characters and will not be described.

Schematic Configuration of Projector

Figure 10:
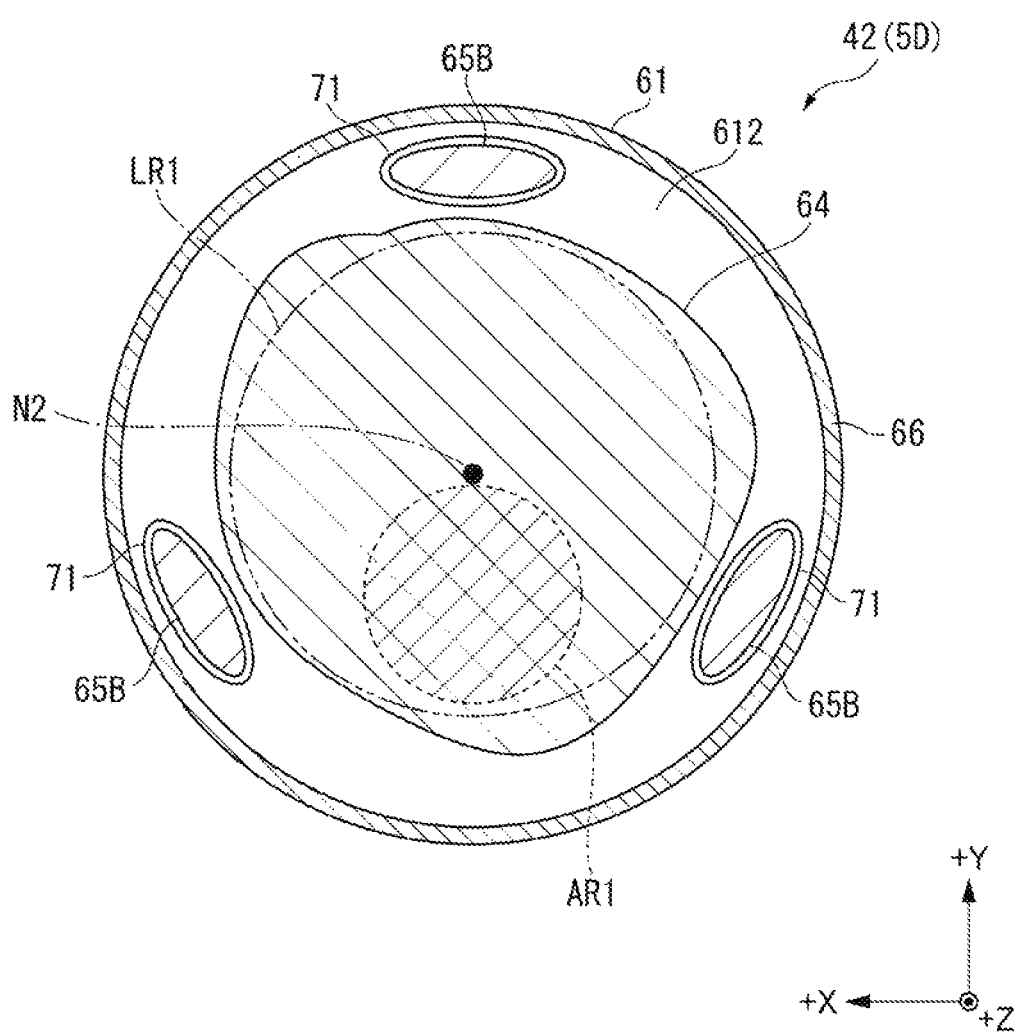
FIG. 10 is a diagrammatic view showing the groove of the optical element provided in the projector according to a fourth embodiment.

FIG. 10 is a diagrammatic view showing grooves 71 provided in the second surface 612 of the first light-transmissive member 61 of an optical element 5D provided in the projector according to the present embodiment.

The projector according to the present embodiment has the same configuration and function as those of the projector 1 according to the first embodiment except that the optical element 5A according to the first embodiment is replaced with the optical element 5D shown in FIG. 10. That is, the projection optical apparatus 4 according to the present embodiment includes the optical element 5D shown in FIG. 10 in place of the optical element 5A according to the first embodiment.

Configuration of Optical Element

The optical element 5D has the same configuration and function as those of the optical element 5B according to the second embodiment except that the optical element 5D further has the grooves 71. That is, the optical element 5D includes the first light-transmissive member 61, the second light-transmissive member 62, the third light-transmissive member 63, the first joining member 64, the second joining members 65B, the spacer 66, and the third joining member 67, the fourth joining member 68, the spacer 69, and the grooves 71.

The grooves 71 are provided outside the first joining member 64 and surround the second joining members 65B. In detail, the grooves 71 are formed in an annular shape surrounding the second joining members 65B when viewed in the direction +Z.

In the present embodiment, the grooves 71 are provided in the second surface 612 out of the second surface 612 and the first surface 621. That is, the second surface 612 as the first joint surface has the grooves 71 provided outside the first joining member 64, and the grooves 71 surround the second joining members 65B, but not necessarily. The first surface 621 may have the grooves 71, or the second surface 612 and the first surface 621 may each have the grooves 71. The second surface 612 corresponds to the first joint surface, and the first surface 621 corresponds to the second joint surface.

Out of the third joining member 67 and the fourth joining member 68, which join the second surface 622 of the second light-transmissive member 62 and the first surface 631 of the third light-transmissive member 63, the fourth joining member 68 may be provided in the same manner in which the second joining members 65B are provided, and the grooves 71 surrounding the fourth joining members 68 may be provided in at least one of the second surface 622 and the first surface 631. The second surface 622 corresponds to the fourth joint surface, and the first surface 631 corresponds to the third joint surface, as described above.

The projector including the projection optical apparatus 4 including the thus configured optical element 5D provides the same effects as those provided by the projector including the projection optical apparatus 4 including the optical element 5C according to the third embodiment.

Fifth Embodiment

A fifth embodiment of the present disclosure will next be described.

The projector according to the present embodiment has the same configuration as that of the projector 1 according to the first embodiment but differs therefrom in that two spacers are provided between the first light-transmissive member 61 and the second light-transmissive member 62. In the following description, portions that are the same or substantially the same as the portions having been already described have the same reference characters and will not be described.

Schematic Configuration of Projector

Figure 11:
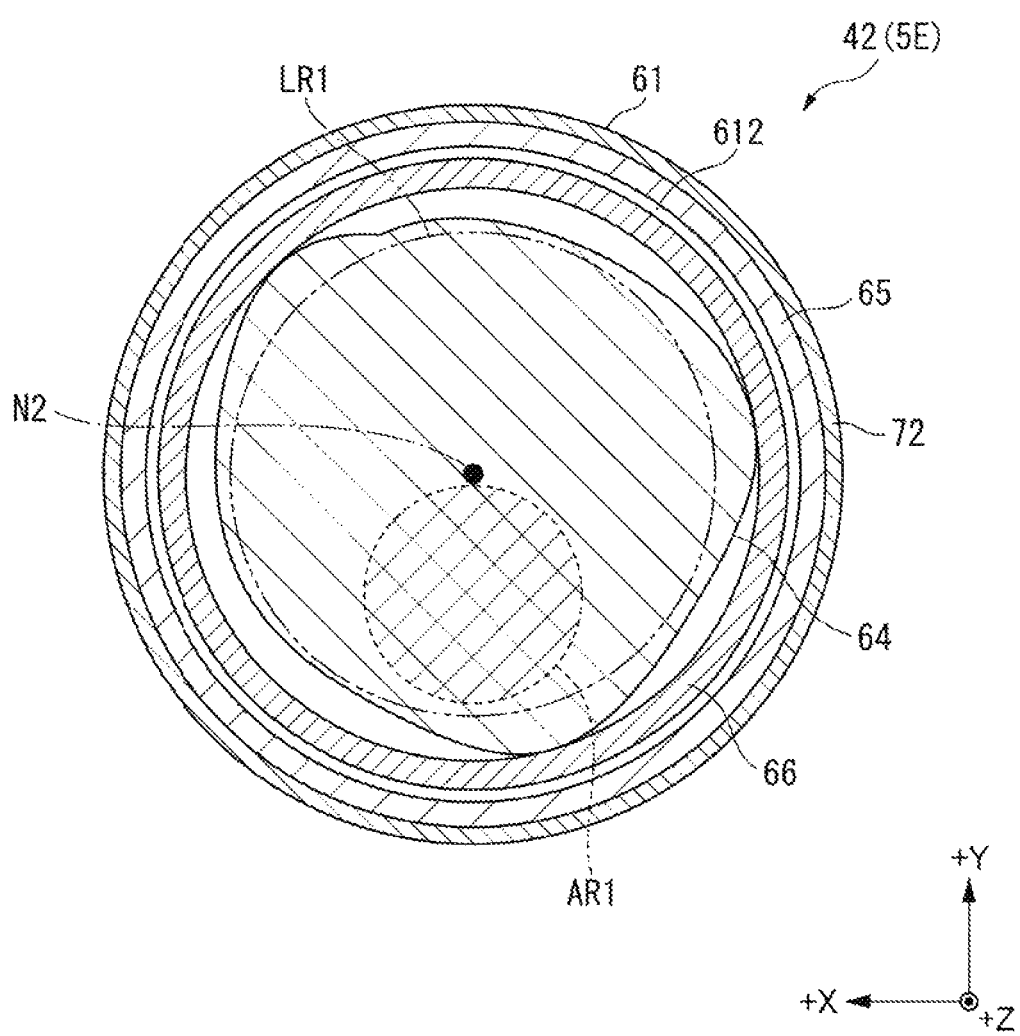
FIG. 11 is a diagrammatic view showing two spacers of the optical element provided in the projector according to a fifth embodiment.

FIG. 11 is a diagrammatic view showing two spacers 66 and 72 provided between the first light-transmissive member 61 and the second light-transmissive member 62 of an optical element 5E provided in the projector according to the present embodiment.

The projector according to the present embodiment has the same configuration and function as those of the projector 1 according to the first embodiment except that the optical element 5A according to the first embodiment is replaced with the optical element 5E shown in FIG. 11. That is, the projection optical apparatus 4 according to the present embodiment includes the optical element 5E shown in FIG. 11 in place of the optical element 5A according to the first embodiment.

Configuration of Optical Element

The optical element 5E has the same configuration and function as those of the optical element 5A according to the first embodiment except that the spacer 72 is further provided. That is, the optical element 5E includes the first light-transmissive member 61, the second light-transmissive member 62, the third light-transmissive member 63, the first joining member 64, the second joining member 65, the spacer 66, the third joining member 67, the fourth joining member 68, the spacer 69, and the spacer 72.

In the optical element 5E, the spacer 66 corresponds to the first spacer in the present disclosure. In the present embodiment, unlike the spacer 66 in the optical element 5A according to the first embodiment, the spacer 66 is provided outside the effective diameter region LR1 of the first light-transmissive member 61 and between the first joining member 64 and the second joining member 65. That is, the spacer 66 surrounds the first joining member 64 when viewed in the direction +Z.

The spacer 72 corresponds to a second spacer in the present disclosure. The spacer 72 is disposed between the second surface 612 and the first surface 621. That is, the spacer 72 is in contact with the second surface 612 and the first surface 621. The second surface 612 corresponds to the first joint surface, and the first surface 621 corresponds to the second joint surface.

The spacer 72 is provided on the side facing the outer circumferential edge of the second surface 612 with respect to the second joining member 65. In detail, the spacer 72 is provided in an annular shape along the circumferential direction around the second optical axis N2 and extends along the outer circumferential edge of the second surface 612. That is, the spacer 72 is disposed in an annular shape outside the second joining member 65 when viewed in the direction +Z. In the present embodiment, the spacer 72 is made of metal, as the spacer 66 is, and may instead be made of resin.

Furthermore, two spacers similar to the spacers 66 and 72 may be disposed between the second surface 622 of the second light-transmissive member 62 and the first surface 631 of the third light-transmissive member 63 in place of the spacer 69.

Effects of Fifth Embodiment

The projector according to the present embodiment described above provides the effects below as well as the same effects as those provided by the projector 1 according to the first embodiment.

The optical element 5E includes the spacer 66 and the spacer 72 disposed between the second surface 612 and the first surface 621. The spacer 66 corresponds to the first spacer and is provided between the first joining member 64 and the second joining member 65. The spacer 72 corresponds to the second spacer and is provided on the side facing the outer circumferential edge of the second surface 612 with respect to the second joining member 65. The second surface 612 corresponds to the first joint surface.

According to the configuration described above, in which the spacers 66 and 72 are disposed between the second surface 612 and the first surface 621, the dimension between the second surface 612 and the first surface 621 can be stably maintained.

In addition, providing the spacer 66 between the first joining member 64 and the second joining member 65 can prevent the second adhesive of which the second joining member 65 is made from leaking through the spacer 66 so that the first adhesive of which the first joining member 64 is made and the second adhesive of which the second joining member 65 is made are mixed with each other in the effective diameter region LR1.

Sixth Embodiment

A sixth embodiment of the present disclosure will next be described.

The projector according to the present embodiment has the same configuration as that of the projector 1 according to the fifth embodiment and differs therefrom in that the spacer disposed on the inner side out of the two spacers provided in the optical element is provided with cutouts. In the following description, portions that are the same or substantially the same as the portions having been already described have the same reference characters and will not be described.

Schematic Configuration of Projector

Figure 12:
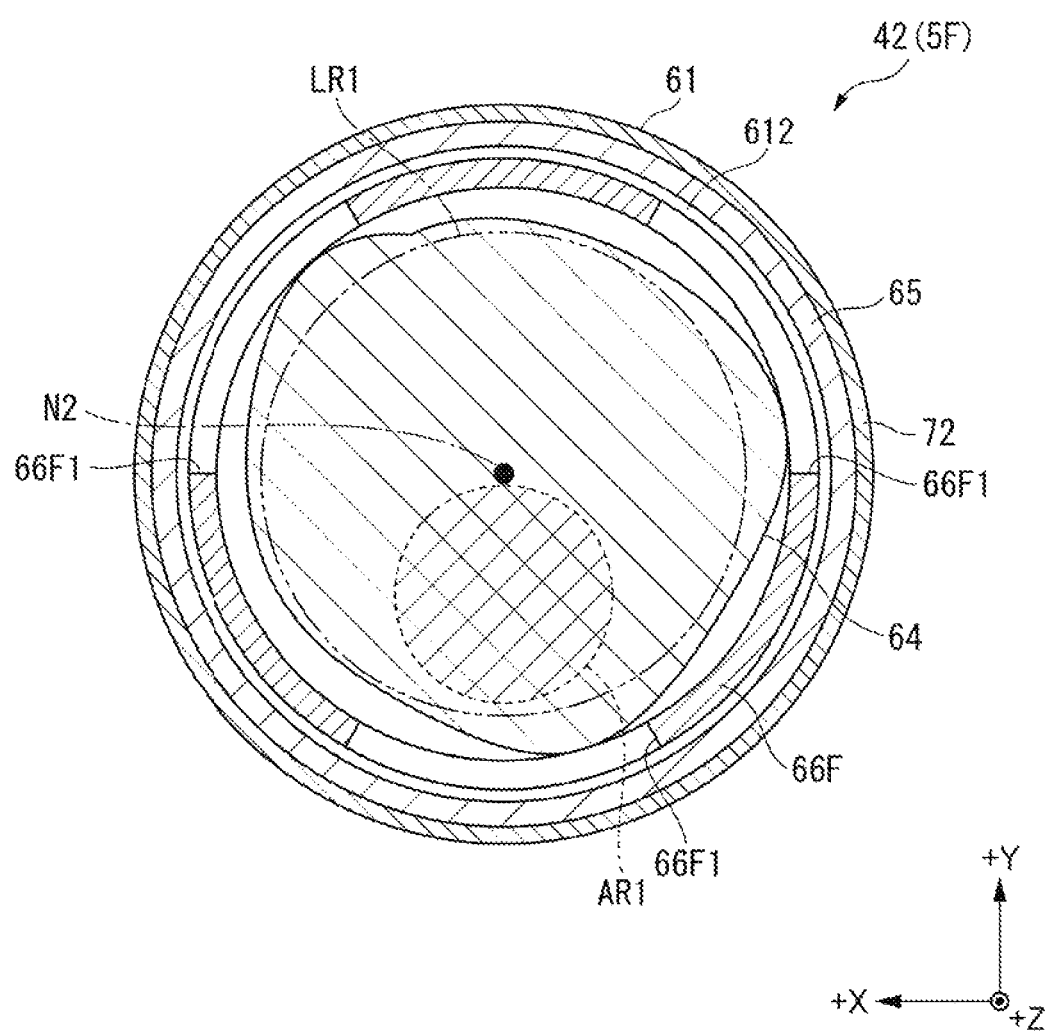
FIG. 12 is a diagrammatic view showing two spacers of the optical element provided in the projector according to a sixth embodiment.

FIG. 12 is a diagrammatic view showing two spacers 66F and 72 provided between the first light-transmissive member 61 and the second light-transmissive member 62 of an optical element 5F provided in the projector according to the present embodiment.

The projector according to the present embodiment has the same configuration and function as those of the projector according to the fifth embodiment except that the optical element 5E according to the fifth embodiment is replaced with the optical element 5F shown in FIG. 12. That is, the projection optical apparatus 4 according to the present embodiment includes the optical element 5F shown in FIG. 12 in place of the optical element 5E according to the fifth embodiment.

Configuration of Optical Element

The optical element 5F has the same configuration and function as those of the optical element 5E according to the fifth embodiment except that the spacer 66 according to the fifth embodiment is replaced with the spacer 66F. That is, the optical element 5F includes the first light-transmissive member 61, the second light-transmissive member 62, the third light-transmissive member 63, the first joining member 64, the second joining member 65, the spacer 66F, the third joining member 67, the fourth joining member 68, the spacer 69, and the spacer 72.

The spacer 66F corresponds to the first spacer in the present disclosure. The spacer 66F is disposed outside the effective diameter region LR1 of the first light-transmissive member 61 and between the first light-transmissive member 61 and the second light-transmissive member 62 and maintains the distance between the first light-transmissive member 61 and the second light-transmissive member 62 substantially constant. Specifically, the spacer 66F is provided between the second surface 612 and the first surface 621 when the second surface 612 and the first surface 621 are joined to each other by the first joining member 64 and the second joining member 65 and maintains the distance between the second surface 612 and the first surface 621 substantially constant. That is, the spacer 66F is in contact with the second surface 612 and the first surface 621.

The spacer 66F is provided between the first joining member 64 and the second joining member 65 and disposed in an annular shape surrounding the first joining member 64 when viewed in the direction +Z. In the present embodiment, the spacer 66F is made of metal, as the spacer 66 is, and may instead be made of resin.

The spacer 66F has a plurality of cutouts 66F1 provided at equal intervals in the circumferential direction around the second optical axis N2. In the present embodiment, the spacer 66F has three cutouts 66F1.

The cutouts 66F1 causes the region inside the spacer 66F to communicates with the region outside the spacer 66F. The cutouts 66F1 allow the silicone adhesive of which the first joining member 64 is made and which is provided in the spacer 66F to spread outward in the radial direction around the second optical axis N2 by the pressing force for joining the second surface 612, which is a concavely curved surface, and the first surface 621, which is a convexly curved surface, to each other via the first joining member 64 and the second joining member 65. That is, the cutouts 66F1 cause an excess portion of the silicone adhesive of which the first joining member 64 is made to be released out of the spacer 66F. The number of cutouts 66F1 provided in the spacer 66F is not limited to three and can be changed as appropriate.

A spacer similar to the spacer 66F may be provided between the second surface 622 of the second light-transmissive member 62 and the first surface 631 of the third light-transmissive member 63.

Effects of Sixth Embodiment

The projector according to the present embodiment described above provides the effects below as well as the same effects as those provided by the projector according to the fifth embodiment.

In the optical element 5F, the spacer 66F has the cutouts 66F1, which cause the region inside the spacer 66F to communicates with the region outside the spacer 66F. The spacer 66F corresponds to the first spacer.

According to the configuration described above, when the first light-transmissive member 61 and the second light-transmissive member 62 are joined to each other, the excess silicone adhesive can be released out of the spacer 66F. Variation in the dimension between the second surface 612 and the first surface 621 that occurs when the excess silicone adhesive is present can therefore be suppressed.

Variations of Embodiments

The present disclosure is not limited to the embodiments described above, and variations, improvements, and other modifications to the extent that the advantage of the present disclosure is achieved fall within the scope of the present disclosure.

For example, the configurations shown in the embodiments described above may be combined with each other.

It has been assumed in each of the embodiments described above that the second surface 612 of the first light-transmissive member 61 and the first surface 621 of the second light-transmissive member 62 are each a curved surface. It has also been assumed that the second surface 622 of the second light-transmissive member 62 and the first surface 631 of the third light-transmissive member 63 are each a curved surface. The second surface 612 corresponds to the first joint surface, the first surface 621 corresponds to the second joint surface, the second surface 622 corresponds to the fourth joint surface, and the first surface 631 corresponds to the third joint surface. The assumptions described above are not necessarily made, and the surfaces 612, 621, 622, and 631 may each not be a curved surface. For example, the second surface 612 and the first surface 621 may each be a flat surface, and the second surface 622 and the first surface 631 may each be a flat surface.

In the embodiments described above, the reflection surface 52 of each of the optical elements 5A to 5F reflects in the directions +Y and +Z the image light incident in the direction −Z via the first transmission surface 51 and causes the reflected image light to exit via the second transmission surface 53, but not necessarily. An optical element in the present disclosure may transmit light in one direction. That is, the optical element may not have a reflection surface. For example, an optical element in which the second light-transmissive member 62 and the third light-transmissive member 63 are joined to each other is also an optical element according to the present disclosure. In this case, the second light-transmissive member 62 corresponds to a second light-transmissive member, the third light-transmissive member 63 corresponds to a first light-transmissive member, and the third joining member 67 corresponds to a first joining member, and the fourth joining member 68 corresponds to a second joining member. Out of the third joining member 67 and the fourth joining member 68, which join the second light-transmissive member 62 and the third light-transmissive member 63 to each other, one of the joining members may be omitted.

It has been assumed in each of the embodiments described above that the first joining member 64 is disposed in the effective diameter region LR1 of the first light-transmissive member 61, which is the smaller one of the effective diameter region of the first light-transmissive member 61 and the effective diameter region of the second light-transmissive member 62, and disposed so as to extend outward from the effective diameter region LR1. It has similarly been assumed that the third joining member 67 is disposed in the effective diameter region LR2 of the second light-transmissive member 62, which is the smaller one of the effective diameter region of the second light-transmissive member 62 and the effective diameter region of the third light-transmissive member 63, and disposed so as to extend outward from the effective diameter region LR2. The assumptions described above are, however, not necessarily made, and at least part of the first joining member 64 may be disposed in the effective diameter region LR1, and at least part of the third joining member 67 may be disposed in the effective diameter region LR2. That is, the first joining member 64 may be provided in accordance with the light passage region AR1, where the light passes through the second surface 612 and the first surface 621, and the third joining member 67 may be provided in accordance with the light passage region AR2, where the light passes through the second surface 622 and the first surface 631.

It has been assumed in the embodiments described above that at least one spacer, such as the spacer 66, 66F, or 72, is provided between the second surface 612 of the first light-transmissive member 61 and the first surface 621 of the second light-transmissive member 62. It has further been assumed that at least one spacer, such as the spacer 69, is provided between the second surface 622 of the second light-transmissive member 62 and the first surface 631 of the third light-transmissive member 63. The assumptions described above are, however, not necessarily made, and an optical element according to the present disclosure may not include a spacer.

It has been assumed in the embodiments described above that the spacers 66 and 66F are each disposed outside the first joining member 64, but not necessarily. The spacers 66 and 66F are each not necessarily disposed outside the first joining member 64, as in the case shown in the sixth embodiment where the first adhesive leaks out of the spacer 66F via the cutouts 66F1 of the spacer 66F.

It has been assumed in the sixth embodiment described above that the optical element 5F includes the spacer 72 as the second spacer, but not necessarily. The spacer 72 may be omitted.

It has been assumed in each of the embodiments described above that the second light-transmissive member 62 is made of glass. The glass material of which the second light-transmissive member 62 is made may contain a substance other than glass. The second light-transmissive member 62 may instead be made of a material other than a glass material. That is, the composition of the second light-transmissive member 62 is not limited to the composition described above and may not contain glass.

It has been assumed in each of the embodiments described above that the first light-transmissive member 61, specifically, the first surface 611, which forms the reflection surface 52, focuses the incident light in the second light-transmissive member 62, but not necessarily. The first surface 611 may reflect the incident light without focusing the light or may diffuse the incident light.

It has been assumed in each of the embodiments described above that the first resin of which the first light-transmissive member 61 is made is a resin material containing a cycloolefin polymer as the primary component. It has also been assumed that the first resin may be a transparent optical resin material containing an acrylic resin, such as polycarbonate and polymethylmethacrylate, but not necessarily. The composition of the first resin is not limited to the composition described above. The same applies to the second resin of which the third light-transmissive member 63 is made.

It has been assumed in each of the embodiments described above that the first joining member 64 and the second joining member 65 are each made of a silicone adhesive, but not necessarily. The first joining member 64 and the third joining member 67 may each contain another adhesive in addition to the silicone adhesive, and the other adhesive may be any adhesive. That is, the first joining member 64 and the third joining member 67 may each be made of a plurality of adhesives including a silicone adhesive.

It has also been assumed that the silicone adhesives of which the first joining member 64 and the third joining member 67 are made contains a dimethyl-based silicone adhesive as the primary component, but not necessarily. The silicone adhesive may instead contain a silicone adhesive other than a dimethyl-based silicone adhesive as the primary component.

It has further been assumed that an epoxy-based adhesive is presented by way of example as the adhesive of which the second joining members 65 and 65B and the fourth joining member 68 are made, but not necessarily. The adhesive of which the second joining member and the fourth joining member are made may be any other adhesive having adhesiveness higher than the adhesiveness of the adhesive of which the first joining member and the third joining member are made.

It has been assumed in each of the embodiments described above that the first joining member 64 joins the second surface 612 and the first surface 621 to each other over the entire light passage region AR1, where the light passes through the second surface 612 and the first surface 621. The second surface 612 corresponds to the first joint surface, and the first surface 621 corresponds to the second joint surface. The assumption described above is not necessarily made, and the first joining member 64 may not form part of the light passage region AR1 and may be provided outside the light passage region AR1 as long as the first joining member 64 is provided in the small one of the effective diameter region of the first light-transmissive member 61 and the effective diameter region of the second light-transmissive member 62. Similarly, the third joining member 67 may not form part of the light passage region AR2 and may be provided outside the light passage region AR2 as long as the third joining member 67 is provided in the small one of the effective diameter region of the second light-transmissive member 62 and the effective diameter region of the third light-transmissive member 63.

It has been assumed in the embodiments described above that in the optical elements 5A to 5F, the third joining member 67, the fourth joining member 68, and the spacer 69 are disposed between the second light-transmissive member 62 and the third light-transmissive member 63, but not necessarily. The third light-transmissive member 63, the third joining member 67, the fourth joining member 68, and the spacer 69 may be omitted. In this case, for example, the third light-transmissive member 63 may be integrated with the second light-transmissive member 62. That is, the second light-transmissive member 62 and the third light-transmissive member 63 may be made of a single material different from that of the first light-transmissive member 61, for example, a glass material and integrated with each other.

It has been assumed in the embodiments described above that the first light-transmissive member 61, the second light-transmissive member 62, and the third light-transmissive member 63 are each a lens, but not necessarily. At least one of the first, second, and third light-transmissive members may not be a lens.

Furthermore, the present disclosure is applicable to a joined lens formed by joining at least two optical parts to each other. For example, the present disclosure may be applied to at least one of the lenses L2, L3, L4, L7, and L8.

It has been assumed in each of the embodiments described above that the projector 1 includes the three light modulators 363, but not necessarily. The present disclosure is also applicable to a projector including two or lessor four or more light modulators.

It has been assumed in each of the embodiments described above that the image generator 32 includes the optical parts and has the layout shown in FIG. 3, but not necessarily. The optical parts provided in the image generator 32 and the layout thereof are not limited to the those described above.

It has been assumed in each of the embodiments described above that the projection optical apparatus 4 includes the plurality of lenses L1 to L10 shown in FIG. 4 and one of the optical elements 5A to 5F, but not necessarily. The optical parts provided in the projection optical apparatus 4 and the layout thereof are not limited to the those described above.

It has been assumed in each of the embodiments described above that the light modulators 363 are each formed of a transmissive liquid crystal panel having a light incident surface and a light exiting surface different from each other. The light modulators 363 may instead each be formed of a reflective liquid crystal panel having a surface that serves both as the light incident surface and the light exiting surface. Furthermore, a light modulator using any component other than a liquid-crystal-based component and capable of modulating an incident luminous flux to form an image according to image information, such as a device using micromirrors, for example, a digital micromirror device (DMD), may be employed.

The aforementioned embodiments have been described with reference to the case where one of the optical elements 5A, 5B, 5C, 5D, 5E, and 5F is used in the projection optical apparatus 4, which projects the light incident thereon, and the case where the projection optical apparatus 4 is used in the projector 1, but not necessarily. An optical element according to the present disclosure may be used in an optical apparatus other than a projection optical apparatus, and an optical apparatus similar to the projection optical apparatus according to the present disclosure may be used in an electronic instrument other than a projector, for example, an imaging apparatus.

Overview of Present Disclosure

The present disclosure will be summarized below as additional remarks.

An optical element according to a first aspect of the present disclosure includes a first light-transmissive member made of a first resin and having a first surface having an aspheric shape and a first joint surface provided on the side opposite from the first surface, a second light-transmissive member made of a material different from the material of the first light-transmissive member and having a second joint surface, and a first joining member and a second joining member that join the first joint surface and the second joint surface to each other. The first joining member is made of a silicone adhesive and disposed in the smaller one of an effective diameter region of the first light-transmissive member and the effective diameter region of the second light-transmissive member. The second joining member is made of an adhesive having adhesiveness higher than the adhesiveness of the silicone adhesive and is disposed outside the first joining member and outside the smaller effective diameter region.

Silicone adhesives have higher light resistance and heat resistance than other adhesives. That is, silicone adhesives are unlikely to deteriorate due to light and heat. Furthermore, silicone adhesives cure and shrink by smaller amounts than other adhesives and absorb short-wavelength light in the visible wavelength range by smaller amounts than other adhesives.

Therefore, according to the configuration described above, even when the light is incident on the first joining member, deformation, transformation, and other types of deterioration of the first joining member can be suppressed.

The second joining member is made of a second adhesive having adhesiveness higher than the adhesiveness of a first adhesive of which the first joining member is made. The first light-transmissive member and the second light-transmissive member can therefore be joined to each other at increased joining strength. In addition, the second joining member is disposed outside the smaller one of the effective diameter region of the first light-transmissive member and the effective diameter region of the second light-transmissive member. Entry of the light into the second joining member can thus be suppressed, whereby deterioration of the second joining member due to the light can be suppressed.

Therefore, the first light-transmissive member and the second light-transmissive member can be stably joined to each other, and changes in the optical characteristics of the optical element can be suppressed. Furthermore, the amount of light passing through the optical element can be increased.

In the first aspect described above, a first spacer disposed between the first joint surface and the second joint surface may be provided.

According to the configuration described above, even when at least one of the first light-transmissive member and the second light-transmissive member expands due to heat, the dimension corresponding to the expansion of the at least one of the light-transmissive members can be ensured between the first joint surface and the second joint surface.

Furthermore, since the thickness of the first joining member can be maintained substantially constant, changes in the optical characteristics of the optical element due, for example, to variations in the thickness of the first joining member can be suppressed.

In the first aspect described above, the first spacer may be disposed outside the first joining member. That is, the first spacer may be disposed outside a light passage region where the light passes through the first joint surface and the second joint surface.

According to the configuration described above, the situation in which the first spacer blocks the light passing through the first joint surface and the second joint surface can be suppressed.

In the first aspect described above, the optical element may include a second spacer disposed between the first joint surface and the second joint surface. The first spacer may be provided between the first joining member and the second joining member. The second spacer may be provided on the side facing the outer circumferential edge of the first joint surface with respect to the second joining member.

According to the configuration described above, in which the first and second spacers are disposed between the first joint surface and the second joint surface, the dimension between the first joint surface and the second joint surface can be stably maintained.

In addition, providing the first spacer between the first joining member and the second joining member can prevent the second adhesive, of which the second joining member is made, from leaking through the first spacer so that the first adhesive, of which the first joining member is made, and the second adhesive, of which the second joining member is made, are mixed with each other in the effective diameter region.

In the first aspect described above, the first spacer may have a cutout that causes the region inside the first spacer to communicate with the region outside the first spacer.

According to the configuration described above, when the first light-transmissive member and the second light-transmissive member are joined to each other, an excess portion of the silicone adhesive can be released out of the first spacer. Variation in the dimension between the first joint surface and the second joint surface that occurs when the excess silicone adhesive is present can therefore be suppressed.

In the first aspect described above, at least one of the first joint surface and the second joint surface may have a groove provided between the first joining member and the second joining member, and the groove may surround the first joining member.

The configuration described above can suppress a situation in which the first adhesive of which the first joining member is made and the second adhesive of which the second joining member is made are mixed with each other in the effective diameter region described above.

In the first aspect described above, at least one of the first joint surface and the second joint surface may have a groove provided outside the first joining member, and the groove may surround the second joining member.

The configuration described above can suppress a situation in which the first adhesive of which the first joining member is made and the second adhesive of which the second joining member is made are mixed with each other in the effective diameter region described above.

In the first aspect described above, the second light-transmissive member may be made of glass.

The refractive index of silicone resin is close to the refractive index of glass. The situation in which the joining member between the first light-transmissive member and the second light-transmissive member has a refractive index greatly different from the refractive indices of the first light-transmissive member and the second light-transmissive member can therefore be avoided. Changes in the optical characteristics of the optical element can therefore be suppressed.

Furthermore, since the second light-transmissive member is made of glass, deterioration of the second light-transmissive member can be suppressed even when the second light-transmissive member has a region having a relatively high optical density.

In the first aspect described above, the first surface of the first light-transmissive member may focus light incident thereon in the second light-transmissive member.

According to the configuration described above, the first light-transmissive member focuses the light in the second light-transmissive member, so that a region where the optical density is locally high is created in the second light-transmissive member. Even in the case described above, since the second light-transmissive member is made of glass, deterioration of the high optical density region in the second light-transmissive member can be suppressed, whereby changes in the optical characteristics of the second light-transmissive member and in turn the optical characteristics of the optical element can be suppressed.

In the first aspect described above, the first resin may be a resin material containing a cycloolefin polymer as the primary component.

The refractive index of silicone resin is close to the refractive index of cycloolefin polymer.

According to the configuration described above, the situation in which the joining member between the first light-transmissive member and the second light-transmissive member has a refractive index greatly different from the refractive indices of the first light-transmissive member and the second light-transmissive member can be avoided. Changes in the optical characteristics of the optical element can therefore be suppressed.

In the first aspect described above, the silicone adhesive may contain a dimethyl-based silicone adhesive as the primary component.

A dimethyl-based silicone adhesive, even when having absorbed moisture in the ambient environment, absorbs only a small amount of short-wavelength light in the visible wavelength range and can therefore maintain high short-wavelength light transmittance. According to the configuration described above, a decrease in the amount of light passing through the optical element can be suppressed.

In the first aspect described above, the optical element may include a third light-transmissive member having a third joint surface, made of a second resin, and disposed on the side opposite from the first light-transmissive member with the second light-transmissive member interposed therebetween and a third joining member that joins the second light-transmissive member and the third light-transmissive member to each other. The second light-transmissive member may have a fourth joint surface disposed on the side opposite from the second joint surface and joined to the third joint surface by the third joining member. The third joining member may be made of the silicone adhesive, disposed in the smaller one of the effective diameter region of the second light-transmissive member and the effective diameter region of the third light-transmissive member, and join the third joint surface and the fourth joint surface to each other.

The configuration described above allows the second light-transmissive member and the third light-transmissive member to be stably joined to each other. In addition, changes in the optical characteristics of the optical element can be suppressed. Furthermore, the amount of light passing through the optical element can be increased. Moreover, since the third light-transmissive member is made of the second resin, the weight of the optical element can be reduced as compared with a case where the third light-transmissive member is made of glass.

A projection optical apparatus according to a second aspect of the present disclosure is a projection optical apparatus that projects light incident thereon and includes the optical element according to the first aspect described above.

The configuration described above can provide the same effects as those provided by the optical element according to the first aspect described above. Furthermore, changes in the optical characteristics of the optical element can be suppressed, whereby deterioration of the imaging performance of the projection optical apparatus can be suppressed.

A projector according to a third aspect of the present disclosure includes a light source, a light modulator that modulates light outputted from the light source, and the projection optical apparatus according to the second aspect described above, which projects the light modulated by the light modulator.

The configuration described above can provide the same effects as those provided by the projection optical apparatus according to the second aspect described above. A projector capable of stably projecting an image can thus be achieved.

What is claimed is:

1. An optical element comprising:
a first light-transmissive member made of a first resin and having a first surface having an aspheric shape and a first joint surface provided on a side opposite from the first surface;
a second light-transmissive member made of a material different from the material of the first light-transmissive member and having a second joint surface; and
a first joining member and a second joining member that join the first joint surface and the second joint surface to each other,
wherein the first joining member is made of a silicone adhesive and disposed in a smaller effective diameter region of the effective diameter region of the first light-transmissive member and the effective diameter region of the second light-transmissive member, and
the second joining member is made of an adhesive having adhesiveness higher than the adhesiveness of the silicone adhesive and is disposed outside the first joining member and outside the smaller effective diameter region.

2. The optical element according to claim 1,
further comprising a first spacer disposed between the first joint surface and the second joint surface.

3. The optical element according to claim 2,
wherein the first spacer is disposed outside the first joining member.

4. The optical element according to claim 2,
further comprising a second spacer disposed between the first joint surface and the second joint surface,
wherein the first spacer is provided between the first joining member and the second joining member, and
the second spacer is provided on a side facing an outer circumferential edge of the first joint surface with respect to the second joining member.

5. The optical element according to claim 2,
wherein the first spacer has a cutout that causes a region inside the first spacer to communicate with a region outside the first spacer.

6. The optical element according to claim 1,
wherein at least one of the first joint surface and the second joint surface has a groove provided between the first joining member and the second joining member, and
the groove surrounds the first joining member.

7. The optical element according to claim 1,
wherein at least one of the first joint surface and the second joint surface has a groove provided outside the first joining member, and
the groove surrounds the second joining member.

8. The optical element according to claim 1,
wherein the second light-transmissive member is made of glass.

9. The optical element according to claim 8,
wherein the first surface of the first light-transmissive member focuses light incident thereon in the second light-transmissive member.

10. The optical element according to claim 1, wherein the first resin is a resin material containing a cycloolefin polymer as a primary component.

11. The optical element according to claim 1, wherein the silicone adhesive contains a dimethyl-based silicone adhesive as a primary component.

12. The optical element according to claim 1, further comprising:
- a third light-transmissive member having a third joint surface, made of a second resin, and disposed on a side opposite from the first light-transmissive member with the second light-transmissive member interposed therebetween; and
- a third joining member that joins the second light-transmissive member and the third light-transmissive member to each other,
- wherein The second light-transmissive member has a fourth joint surface disposed on a side opposite from the second joint surface and joined to the third joint surface by the third joining member, and
- the third joining member is made of the silicone adhesive, disposed in a smaller effective diameter region of the effective diameter region of the second light-transmissive member and the effective diameter region of the third light-transmissive member, and joined the third joint surface and the fourth joint surface to each other.

13. A projection optical apparatus that projects light incident thereon, the apparatus comprising:
the optical element according to claim 1.

14. A projector comprising:
- a light modulator that modulates light outputted from a light source; and
- the projection optical apparatus according to claim 13, which projects the light modulated by the light modulator.

* * * * *